United States Patent
Tamura et al.

(10) Patent No.: US 12,089,150 B2
(45) Date of Patent: Sep. 10, 2024

(54) COMMUNICATION TERMINAL AND METHOD THEREFOR

(71) Applicant: NEC Corporation, Tokyo (JP)

(72) Inventors: Toshiyuki Tamura, Tokyo (JP); Tsuyoshi Takakura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 97 days.

(21) Appl. No.: 18/012,120

(22) PCT Filed: Sep. 29, 2021

(86) PCT No.: PCT/JP2021/035975
§ 371 (c)(1),
(2) Date: Dec. 21, 2022

(87) PCT Pub. No.: WO2022/071437
PCT Pub. Date: Apr. 7, 2022

(65) Prior Publication Data
US 2023/0180120 A1 Jun. 8, 2023

(30) Foreign Application Priority Data
Oct. 2, 2020 (JP) ................. 2020-167942

(51) Int. Cl.
*H04W 48/18* (2009.01)
*H04W 12/06* (2021.01)
*H04W 48/08* (2009.01)
*H04W 84/04* (2009.01)

(52) U.S. Cl.
CPC .......... *H04W 48/18* (2013.01); *H04W 12/06* (2013.01); *H04W 48/08* (2013.01); *H04W 84/042* (2013.01)

(58) Field of Classification Search
CPC ..... H04W 48/18; H04W 12/06; H04W 48/08; H04W 84/042; H04W 48/16
See application file for complete search history.

(56) References Cited

U.S. PATENT DOCUMENTS

2021/0250890 A1* 8/2021 Won ...................... H04W 48/16

OTHER PUBLICATIONS

3GPP TS 24.501 v17.0.0; 3rd Generation Partnership Project; Technical Specification Group Core Network and Terminals; Non-Access-Stratum (NAS) protocol for 5G System (5GS); Stage3; Release 17, pp. 78-80, 494, 501 (Year: 2020).*
International Search Report for PCT Application No. PCT/JP2021/035975, mailed on Dec. 14, 2021.

(Continued)

*Primary Examiner* — Brandon J Miller
(74) *Attorney, Agent, or Firm* — Sughrue Mion, PLLC

(57) ABSTRACT

A communication terminal (1) receives a first Single NSSAI (S-NSSAI) included in a configuration update command message, and stores the first S-NSSAI into Rejected NSSAI. In addition, the communication terminal (1) receives a second S-NSSAI included in an Extended rejected NSSAI information element. For example, this allows the communication terminal (1) to properly manage or update its NSSAI storage, when multiple Mapped S-NSSAIs are associated with a single Serving PLMN S-NSSAI and part or all of the multiple Mapped S-NSSAIs are subject to NSSAA.

2 Claims, 20 Drawing Sheets

(56) References Cited

OTHER PUBLICATIONS

3GPP TS 23.501 V16.5.1 (Aug. 2020)"3rd Generation Partnership Project; Technical Specification Group Services and System Aspects; System Architecture for the 5G System (5GS); Stage 2 (Release 16)" Aug. 2020.
3GPP TS 23.502 V16.5.1 (Aug. 2020)"3rd Generation Partnership Project; Technical Specification Group Services and System Aspects; Procedures for the 5G System (5GS); Stage 2 (Release 16)" Aug. 2020.
3GPP TS 24.501 V16.5.1 (Jul. 2020)"3rd Generation Partnership Project; Technical Specification Group Core Network and Terminals; Non-Access-Stratum (NAS) protocol for 5G System (5GS); Stage 3 (Release 16)" Jul. 2020.
Oppo,"NSSAA Slice handling for 1-to-many mapping in roaming scenario", C1-205232, 3GPP TSG-CT WG1 Meeting #125-e, Electronic meeting, Aug. 20-28, 2020.
Huawei, HiSilicon, China Mobile,"Rejected NSSAI due to subscription", 3GPP TSG CT WG1 #125e C1-205547, Aug. 27, 2020.
Huawei, HiSilicon, China Mobile,"Rejected NSSAI due to subscription",3GPP TSG CT WG1 #125e C1-205102, Aug. 13, 2020.
Huawei, HiSilicon,"Correction to Configred NSSAI updation based on Rejected NSSAI", GPP TSG CT WG1 #125e C1-205527, Aug. 27, 2020.
Oppo, "Extended rejected NSSAI storage", 3GPP TSG CT WG1 #126e C1-206047, Oct. 7, 2020.
Extended European Search Report for EP Application No. 21875734. 2, dated on Oct. 17, 2023.
"3rd Generation Partnership Project; Technical Specification Group Core Network and Terminals; Non-Access-Stratum (NAS) protocol for 5G System (5GS); Stage 3; (Release 17)", 3GPP TS 24.501, V17.0.0, Sep. 25, 2020.

* cited by examiner

| | 8 | 7 | 6 | 5 | 4 | 3 | 2 | 1 | |
|---|---|---|---|---|---|---|---|---|---|
| 1401 | \multicolumn{8}{c|}{NSSAI IEI} | octet 1 |
| 1402 | \multicolumn{8}{c|}{Length of NSSAI contents} | octet 2 |
| 1403 | \multicolumn{8}{c|}{S-NSSAI value 1} | octet 3 |
| | | | | | | | | | octet m |
| | \multicolumn{8}{c|}{S-NSSAI value 2} | octet m+1* |
| | | | | | | | | | octet n* |
| | \multicolumn{8}{c|}{...} | octet n+1* |
| | | | | | | | | | octet u* |
| | \multicolumn{8}{c|}{S-NSSAI value n} | octet u+1* |
| | | | | | | | | | octet v* |

Fig. 14

| 8 | 7 | 6 | 5 | 4 | 3 | 2 | 1 | |
|---|---|---|---|---|---|---|---|---|
| \multicolumn{8}{c|}{S-NSSAI IEI} | octet 1 |
| \multicolumn{8}{c|}{Length of S-NSSAI contents} | octet 2 |
| \multicolumn{8}{c|}{SST} | octet 3 |
| \multicolumn{8}{c|}{SD} | octet 4* |
| | | | | | | | | octet 6* |
| \multicolumn{8}{c|}{Mapped HPLMN SST} | octet 7* |
| \multicolumn{8}{c|}{Mapped HPLMN SD} | octet 8* |
| | | | | | | | | octet 10* |

1501: octets 3–6 (SST, SD)
1502: octets 7–10 (Mapped HPLMN SST, Mapped HPLMN SD)

Fig. 15

COMMUNICATION TERMINAL AND METHOD THEREFOR

This application is a National Stage Entry of PCT/JP2021/035975 filed on Sep. 29, 2021, which claims priority from Japanese Patent Application 2020-167942 filed on Oct. 2, 2020, the contents of all of which are incorporated herein by reference, in their entirety.

TECHNICAL FIELD

The present disclosure relates to radio communication networks, and in particular to the management of network slices allowed for radio terminals.

BACKGROUND ART

The 5G system (5GS) supports network slicing (see for example Non-Patent Literature 1 to 3, especially Section 5.15 of Non-Patent Literature 1). Network slicing uses Network Function Virtualization (NFV) and software-defined networking (SDN) technologies to create multiple virtualized logical networks on top of physical networks. Each virtualized logical network is called a network slice. A network slices provides specific network capabilities and network characteristics. In order to form a single network slice, a network slice instance (NSI) is defined as a set of network function (NF) instances, resources (e.g., computer processing resources, storage, and networking resources), and an access network (AN) (one or both of a Next Generation Radio Access Network (NG-RAN) and a Non-3GPP Interworking Function (N3IWF)).

A network slice is identified by an identifier known as Single Network Slice Selection Assistance Information (S-NSSAI). The S-NSSAI consists of a Slice/Service type (SST) and a Slice Differentiator (SD). The SST refers to the expected network slice behaviour in terms of features and services. The SD is optional information and complements the SST to differentiate amongst multiple network slices of the same Slice/Service type.

An S-NSSAI can have standard values or non-standard values. Currently, standard SST values 1, 2, 3, and 4 are associated respectively with enhanced Mobile Broad Band (eMBB), Ultra-Reliable and Low-Latency Communication (URLLC), Massive Internet of Things (MIOT), and Vehicle to Everything (V2X) slice types. Anon-standard value of an S-NSSAI with identifies a single network slice within a specific Public Land Mobile Network (PLMN). In other words, non-standard values are PLMN-specific values, and associated with the PLMN ID of a PLMN that has assigned them. Each S-NSSAI assists a network in selecting a particular NSI. A NSI may be selected via different S-NSSAIs. An S-NSSAI may be associated with different NSIs. A network slice may be uniquely identified by an S-NSSAI.

There are two types of S-NSSAI, which are known as S-NSSAI and Mapped S-NSSAI. An S-NSSAI identifies a network slice provided by the Serving Public Land Mobile Network (Serving PLMN) in which the User Equipment (UE) is registered, and may be referred to in this specification as Serving PLMN S-NSSAI. A Mapped S-NSSAI may be a Home PLMN (HPLMN)S-NSSAI that is mapped to (or is associated with, or is in combination with, or corresponds to) an S-NSSAI identifying a network slice of the roaming network when the UE is roaming, and may also be an S-NSSAI included in the UE user's subscription information among them. Hereafter, S-NSSAI and Mapped S-NSSAI may be referred to collectively as simply S-NSSAI in this specification.

Meanwhile, Network Slice Selection Assistance Information (NSSAI) means a set of S-NSSAIs. Accordingly, one or more S-NSSAIs can be included in one NSSAI. There are multiple types of NSSAI, known as Configured NSSAI, Requested NSSAI, Allowed NSSAI, Rejected NSSAI, and Pending NSSAI.

A Configured NSSAI includes one or more S-NSSAIs each applicable to one or more PLMNs. For example, The Configured NSSAI is configured by a Serving PLMN and is applied to the Serving PLMN. In addition, a Serving PLMN S-NSSAI included in a Configured NSSAI may have one or more Mapped S-NSSAIs associated therewith. Alternatively, the Configured NSSAI may be a Default Configured NSSAI. The Default Configured NSSAI is configured by the Home PLMN (HPLMN) and applies to any PLMNs for which no specific Configured NSSAI has been provided. For example, a radio terminal (User Equipment (UE)) is provisioned with the Default Configured NSSAI from a Unified Data Management (UDM) of the HPLMN via an Access and Mobility Management Function (AMF).

An allowed NSSAI is provided to a UE by a Serving PLMN and indicates one or more S-NSSAIs that the UE can use in the current registration area of the Serving PLMN. The Allowed NSSAI is determined by an AMF of the Serving PLMN, for example, during a registration procedure. The Allowed NSSAI is signaled to the UE by the network (i.e., AMF) and stored in memories (e.g., non-volatile memories) of both the AMF and the UE.

A Rejected NSSAI includes one or more S-NSSAIs rejected by the current PLMN. The Rejected NSSAI may be referred to as rejected S-NSSAIs. A S-NSSAI is rejected throughout the current PLMN or rejected in the current registration area. If an AMF rejects any of one or more S-NSSAIs included in the Requested NSSAI, for example, in a registration procedure of a UE, it includes them in the Rejected NSSAI. The Rejected NSSAI is signaled to the UE by the network (i.e., AMF) and stored in (non-volatile) memories of both the AMF and the UE.

A Pending NSSAI indicates one or more S-NSSAIs for which Network Slice-Specific Authentication and Authorization (NSSAA) is pending. A Serving PLMN shall perform NSSAA for S-NSSAI(s) of the HPLMN which are subject to NSSAA based on subscription information. In order to perform NSSAA, an AMF invokes an Extensible Authentication Protocol (EAP)-based authorization procedure. The EAP-based authentication procedure takes a relatively long time to obtain its outcome. Accordingly, whilst the AMF determines an Allowed NSSAI as described above during a registration procedure of a UE, it does not include S-NSSAI(s) subject to NSSAA in the Allowed NSSAI, but instead them in the Pending NSSAI. The Pending NSSAI is signaled to the UE by the network (i.e., AMF) and stored in (non-volatile) memories of both the AMF and the UE.

An AMF manages a UE context for a UE in the Registration Management (RM)-REGISTERED state. The UE context may be referred to as, but is not limited to, a Mobility Management (MM) context. The UE context may include one or more of the Allowed NSSAI, Rejected NSSAI, and Pending NSSAI described above. On the other hand, the UE manages a UE NSSAI configuration. The UE NSSAI configuration includes the Configured NSSAI, Allowed NSSAI, Rejected NSSAI, and Pending NSSAI described above. The UE NSSAI configuration is stored in non-volatile memory in the UE (Mobile Equipment (ME)

excluding a Universal Subscriber identity Module (USIM)). The memory or memory area in which the UE NSSAI configuration is stored is referred to as NSSAI storage.

A Requested NSSAI information element (IE) is signaled to a network by a UE, for example in a registration procedure, allowing the network to determine the Serving AMF, one or more network slices and one or more NSIs for that UE.

A Requested mapped NSSAI information element (IE) is an information element included in a Registration Request message sent to a network by a UE that has no information about S-NSSAI (Serving PLMN S-NSSAI). This information element includes one or more Mapped S-NSSAIs held by the UE. Unlike the Requested NSSAI IE, which contains both a Serving PLMN S-NSSAI and Mapped S-NSSAI(s) associated therewith, the Requested mapped NSSAI IE contains only Mapped S-NSSAI(s).

Thereafter, Registration Request messages in this specification may be Registration Request messages for Initial Registration, or for Mobility Registration Update, or for Periodic Registration Update.

CITATION LIST

Non Patent Literature

[Non-Patent Literature 1] 3GPP TS 23.501 V16.5.1 (2020-08) "3rd Generation Partnership Project: Technical Specification Group Services and System Aspects: System Architecture for the 5G System (5GS): Stage 2 (Release 16)", August 2020

[Non-Patent Literature 2] 3GPP TS 23.502 V16.5.1 (2020-08) "3rd Generation Partnership Project: Technical Specification Group Services and System Aspects: Procedures for the 5G System (5GS); Stage 2 (Release 16)", August 2020

[Non-Patent Literature 3] 3GPP TS 24.501 V16.5.1 (2020-07) "3rd Generation Partnership Project: Technical Specification Group Core Network and Terminals: Non-Access-Stratum (NAS) protocol for 5G System (5GS): Stage 3 (Release 16)", July 2020

[Non-Patent Literature 4] OPPO, "NSSAA Slice handling for 1-to-many mapping in roaming scenario", C1-205232, 3GPP TSG-CT WG1 Meeting #125-e, Electronic meeting, 20-28 Aug. 2020

SUMMARY OF INVENTION

Technical Problem

In a roaming scenario, multiple Mapped S-NSSAIs (i.e., Home PLMN (HPLMN)S-NSSAIs) may be associated with a single Serving PLMN S-NSSAI. In addition, part or all of these multiple Mapped S-NSSAIs may be subject to Network Slice-Specific Authentication and Authorization (NSSAA). For example, an AMF may receive a Registration Request from a UE supporting NSSAA that contains a Mapped S-NSSAI subject to NSSAA and a Mapped S-NSSAI that is not subject to NSSAA, and these two Mapped S-NSSAIs may be mapped to (or associated with) the same Serving PLMN S-NSSAI. In this case, it is not clear how the AMF would allow this Serving PLMN S-NSSAI to the UE. Specifically, it is not clear whether the AMF should place such Serving PLMN S-NSSAI in Allowed NSSAI or Pending NSSAI.

In addition, for example, an AMF may receive a Registration Request from a UE supporting NSSAA that contains two Mapped S-NSSAIs both subject to NSSAA, and these two Mapped S-NSSAIs may be mapped to (or associated with) the same Serving PLMN S-NSSAI. In this case, it is not clear how the AMF would proceed with the authentication procedure for each of the two Mapped S-NSSAIs. In particular, it is not clear if one of the two Mapped S-NSSAIs has been successfully authenticated and the other has failed, how the AMF would inform the UE that the Serving PLMN S-NSSAI is not available for the Mapped S-NSSAI that has failed to be authenticated.

It is also not clear how the UE would manage or update its NSSAI Storage when two Mapped S-NSSAIs are mapped to the same Serving PLMN S-NSSAI and one or both of these two Mapped S-NSSAIs are subject to NSSAA. More specifically, Section 4.6.2.2 of Non-Patent Literature 3 specifies the NSSAI Storage update procedure for Pending NSSAI. However, it is not clear how the NSSAI Storage update procedure works when at least part of multiple Mapped S-NSSAIS (HPLMN S-NSSAIs) mapped to a single Serving PLMN S-NSSAI are subject to NSSAA.

One of the objects to be attained by embodiments disclosed herein is to provide apparatuses, methods, and programs that contribute to enabling an AMF and a UE to properly manage or update a UE's NSSAI storage when multiple Mapped S-NSSAIs are associated with a single Serving PLMN S-NSSAI, and when part or all of these multiple Mapped S-NSSAIs are subject to an NSSAA. It should be noted that this object is merely one of the objects to be attained by the embodiments disclosed herein. Other objects or problems and novel features will be made apparent from the following description and the accompanying drawings.

Solution to Problem

In a first aspect, a UE includes at least one memory and at least one processor coupled to the at least one memory. The at least one processor is configured to manage an NSSAI storage, including Allowed NSSAI, Pending NSSAI, and Rejected NSSAI. The at least one processor is configured to, if a Serving PLMN S-NSSAI included in at least one of the Pending NSSAI or the Rejected NSSAI is also included in the Allowed NSSAI, send a registration request message, including the Serving PLMN S-NSSAI and a first mapped Home PLMN S-NSSAI that is associated with the Serving PLMN S-NSSAI in the Allowed NSSAI, to a core network node.

In a second aspect, a core network node includes at least one memory and at least one processor coupled to the at least one memory. The at least one processor is configured to receive a first message indicating two or more Home PLMN S-NSSAIs from a UE supporting NSSAA. The at least one processor is configured to, if the two or more Home PLMN S-NSSAIs are associated with a single Serving PLMN S-NSSAI and part of the two or more Home PLMN S-NSSAIs is subject to NSSAA, send a second message including an Allowed NSSAI information element and a Pending NSSAI information element to the UE. The Allowed NSSAI information element contains a combination of the Serving PLMN S-NSSAI and at least one first Home PLMN S-NSSAI that is not subject to the NSSAA. The Pending NSSAI information element contains a combination of the Serving PLMN S-NSSAI and at least one second Home PLMN S-NSSAI that is subject to the NSSAA.

In a third aspect, a method performed by a UE includes the steps of:
- (a) manage an NSSAI storage, including Allowed NSSAI, Pending NSSAI, and Rejected NSSAI; and
- (b) if a Serving PLMN S-NSSAI included in at least one of the Pending NSSAI or the Rejected NSSAI is also included in the Allowed NSSAI, sending a registration request message, including the Serving PLMN S-NSSAI and a first mapped Home PLMN S-NSSAI that is associated with the Serving PLMN S-NSSAI in the Allowed NSSAI, to a core network node.

In a fourth aspect, a method performed by a core network node includes the steps of:
- (a) receiving a first message indicating two or more Home PLMN S-NSSAIs from a UE supporting NSSAA: and
- (b) if the two or more Home PLMN S-NSSAIs are associated with a single Serving PLMN S-NSSAI and part of the two or more Home PLMN S-NSSAIs is subject to NSSAA, sending to the UE a second message including:
- (b1) an Allowed NSSAI information element containing a combination of the Serving PLMN S-NSSAI and at least one first Home PLMN S-NSSAI that is not subject to the NSSAA, and
- (b2) a Pending NSSAI information element containing a combination of the Serving PLMN S-NSSAI and at least one second Home PLMN S-NSSAI that is subject to the NSSAA.

In a fifth aspect, a program includes a set of instructions (software codes) that, when loaded into a computer, cause the computer to perform the method according to the third or fourth aspect described above.

Advantageous Effects of Invention

According to the above-described aspects, it is possible to provide apparatuses, methods, and programs that contribute to enabling an AMF and a UE to properly manage or update a UE's NSSAI storage when multiple Mapped S-NSSAIs are associated with a single Serving PLMN S-NSSAI, and when part or all of these multiple Mapped S-NSSAIs are subject to an NSSAA.

BRIEF DESCRIPTION OF DRAWINGS

FIG. 14 shows parameters set in an extended Rejected NSSAI according to an embodiment;
FIG. 15 shows a format of a parameter set in an extended Rejected NSSAI according to an embodiment.

EXAMPLE EMBODIMENT

Specific embodiments will be described hereinafter in detail with reference to the drawings. The same or corresponding elements are denoted by the same symbols throughout the drawings, and duplicated explanations are omitted as necessary for the sake of clarity.

Each of the embodiments described below may be used individually, or two or more of the embodiments may be appropriately combined with one another. These embodiments include novel features different from each other. Accordingly, these embodiments contribute to attaining objects or solving problems different from one another and contribute to obtaining advantages different from one another.

The following descriptions on the embodiments mainly focus on the 3GPP fifth generation mobile communication system (5G system (5GS)). However, these embodiments may be applied to other radio communication systems that support network slicing as well as 5GS.

First Embodiment

Figure 1:
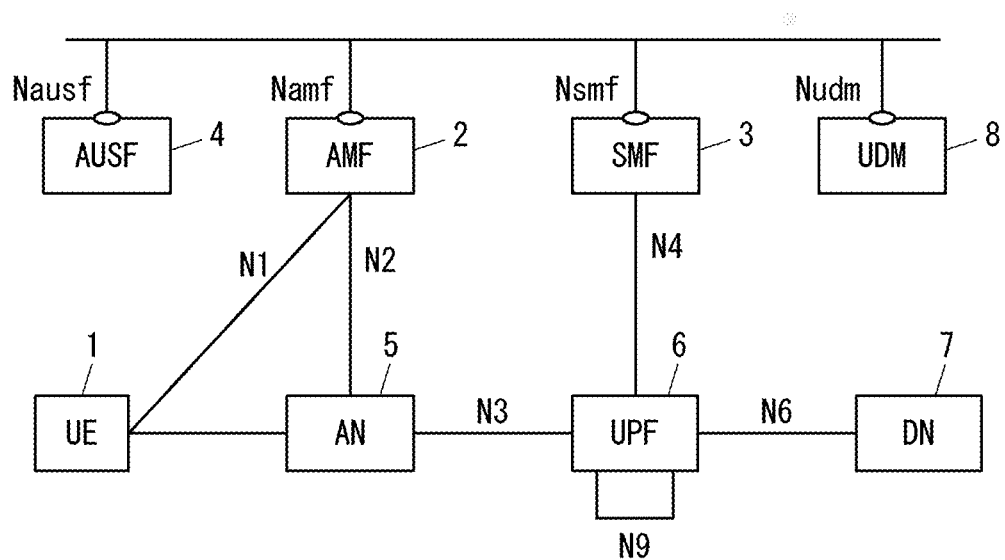
FIG. 1 shows an example configuration of a radio communication network according to an embodiment.

FIG. 1 shows an example configuration of a radio communication network (i.e., 5GS) according to this embodiment. Each of the elements shown in FIG. 1 is a network function and provides an interface as defined by the 3rd Generation Partnership Project (3GPP). Each of the elements (network functions) shown in FIG. 1 can be implemented, for example, as a network element on dedicated hardware, as a software instance running on dedicated hardware, or as a virtual function instantiated on an application platform.

The radio communication network shown in FIG. 1 may be provided by a Mobile Network Operator (MNO), or it may be a Non-Public Network (NPN) provided by a non-MNO. If the radio communication network shown in FIG. 1 is an NPN, it may be an independent network, represented as a Stand-alone Non-Public Network (SNPN), or it may be an NPN linked to an MNO network, represented as a public network integrated NPN.

A radio terminal (i.e., UE) 1 communicates with a data network (DN) 7 using the 5G connectivity service. More specifically, the UE 1 is connected to an access network (i.e., 5G Access Network (5GAN)) 5 and communicates with the data network (DN) 7 via a User Plane Function (UPF) 6 in a core network (i.e., 5G core network (5GC)). The AN 5 may include a Next Generation Radio Access Network (NG-RAN) or a non-3GPP AN, or both. The Non-3GPP AN may be a network that handles wireless LAN (WiFi) communication or a network that handles wired communication, known as a Wireline 5G Access Network (W-5GAN). The UPF 6 may include multiple UPFs that are interconnected.

In the 5G architecture, the connectivity service between the UE 1 and the DN 7 is supported by one or more Protocol Data Unit (PDU) Sessions. A PDU Session is an association, session, or connection between the UE 1 and the DN7. A PDU Session is used to provide a PDU connectivity service (i.e., an exchange of PDUs between the UE 1 and the DN 7). The UE 1 establishes one or more PDU Sessions between the UE 1 and the UPF 6 (i.e., the PDU Session anchor) to which the DN 7 is connected. From a data transfer perspective, a PDU Session consists of a tunnel (N9 tunnel) in the 5GC, a tunnel (N3 tunnel) between the 5GC and the AN 5, and one or more radio bearers. Although not shown in FIG. 1, the UE 1 may establish multiple PDU Sessions with multiple UPFs (PDU Session anchors) 6 to access multiple DNs 7 concurrently.

The AMF 2 is a network function within the 5GC Control Plane. The AMF 2 provides termination of a RAN Control Plane (CP) interface (i.e., N2 interface). The AMF 2 terminates a single signalling connection (i.e., N1 NAS signalling connection) with the UE 1 and provides registration management, connection management, and mobility management. The AMF 2 provides NF services on a service-based interface (i.e., Namf interface) to NF consumers (e.g., other AMFs, Session Management Function (SMF) 3, and Authentication Server Function (AUSF) 4). The NF services provided by the AMF 2 include a communication service (Namf_Communication). The communication service allows NF consumers (e.g., SMF 3) to communicate with the UE 1 or the AN 5 via the AMF 2.

The SMF 3 is a network function within the 5GC Control Plane. The SMF 3 manages PDU Sessions. The SMF 3 sends and receives SM signalling messages (NAS-SM messages, N1 SM messages) to and from the Non-Access-Stratum (NAS) Session Management (SM) layer of the UE 1 via communication services provided by the AMF 2. The SMF 3 provides NF services on a service-based interface (i.e., Nsmf interface) to NF consumers (e.g., AMF 2, other SMFs). The NF services provided by the SMF 3 include a PDU Session management service (Nsmf_PDUSession), which allows NF consumers (e.g., AMF 2) to handle PDU Sessions. The SMF 3 may be an Intermediate SMF (I-SMF). The I-SMF is inserted between the AMF 2 and an original SMF as needed when the UPF 6 belongs to a different SMF service area and cannot be controlled by the original SMF.

The AUSF 4 is a network function within the 5GC Control Plane. The AUSF 4 provides NF services on a service based interface (i.e., Nausf interface) to NF consumers (e.g., AMF 2, UDM 8). The NF services provided by the AUSF 4 include a UE authentication service (e.g., Nausf_UEAuthentication and Nausf_NSSAA_Authenticate). The Nausf_UEAuthentication service provides UE authentication and related key information (keying material) to NF consumers (i.e., AMF). More specifically, the AUSF 4 cooperates with the UDM 8 and Authentication credential Repository and Processing Function (ARPF) to perform authentication using one of the two authentication methods (i.e., 5G-Authentication and Key Agreement (AKA) and EAP-based authentication) supported by the 5GS. After performing the authentication, the AUSF 4 replies to the AMF 2 with the authentication result and, if successful, a master key. The master key is used by the AMF 2 to derive NAS security keys and other security key(s). For UE authentication, the AUSF 4 works closely with the UDM 8. The Nausf_NSSAA_Authenticate service provides NF consumers (e.g., AMF 2) with a Network Slice-Specific Authentication and Authorization service between the UE 1 and an AAA server via the AUSF 4.

The UDM 8 is a network function within the 5GC Control Plane. The UDM 8 provides access to a database (i.e., User Data Repository (UDR)) containing subscriber data (or subscription information). The UDM 8 provides NF services on a service-based interface (i.e., Nudm interface) to NF consumers (e.g., AMF 2, AUSF 4, SMF 3). The NF services provided by the UDM 8 include subscriber data management services. This NF service allows NF consumers (e.g., AMF 2) to retrieve subscriber data and provides updated subscriber data to NF consumers.

The example configuration in FIG. 1 shows only some major NFs for illustrative purposes. The radio communication network in this embodiment may be configured specifically for roaming (see, for example, Section 4.2.4 of Non-Patent Literature 1) and may include other NFs not shown in FIG. 1, such as Network Slice Selection Function (NSSF) and a Policy Control Function (PCF).

Figure 2:
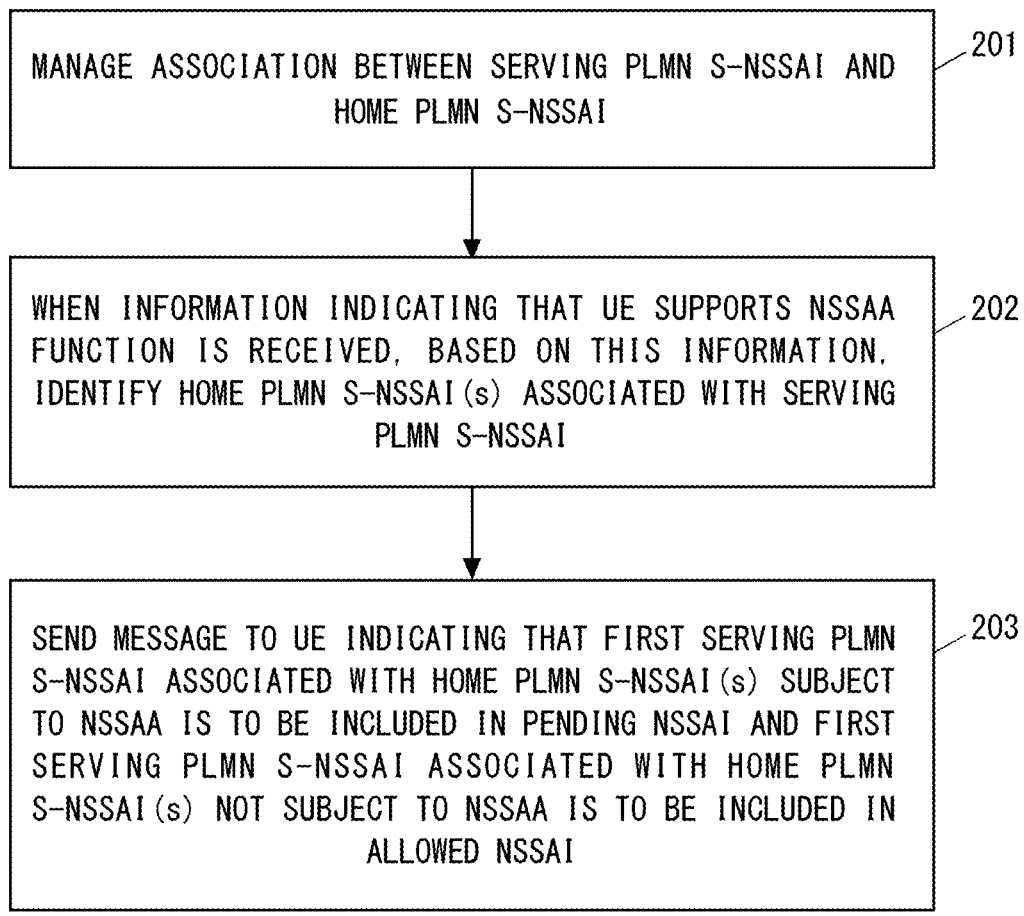
FIG. 2 is a flowchart showing an example of an operation of an AMF according to an embodiment.

FIG. 2 is a flowchart showing an example of the operation of the AMF 2 according to this embodiment. In step 201, the AMF 2 manages (or stores) associations between Serving PLMN S-NSSAIs and Mapped S-NSSAIs (or HPLMN S-NSSAIs). In these associations, one or more Mapped S-NSSAIs may be associated with a single Serving PLMN S-NSSAI. These one or more Mapped S-NSSAIs may be S-NSSAIs of another PLMN (the HPLMN of the UE 1) that is different from the PLMN to which the AMF 2 belongs. Hereinafter, such an association is referred to in this specification as first association. In the first association, multiple Mapped S-NSSAIs are associated with one Serving PLMN S-NSSAI. Part or all of these multiple Mapped S-NSSAIs are subject to Network Slice-Specific Authentication and Authorization (NSSAA).

In step 202, the AMF 2 receives a Registration Request message from the UE 1 containing information indicating whether the UE 1 supports the NSSAA function. Based on this information, the AMF 2 identifies (or determines) Mapped S-NSSAI(s) associated with a Serving PLMN S-NSSAI. More specifically, the AMF 2 may determine whether or not the UE 1 supports the NSSAA function based on 5th generation mobility management (5GMM) Capability information regarding NSSAA contained in the received Registration Request message. The 5GMM Capability information about NSSAA indicates whether the UE 1 supports the NSSAA function. The 5GMM Capability information about NSSAA may be a Network slice-specific authentication and authorization (NSSAA) value included in the 5GMM Capability information. The NSSAA value is an example of information indicating whether NSSAA function is supported. The AMF 2 may recognize that the UE 1 supports the NSSAA function if the NSSAA value indicates "Network slice-specific authentication and authorization supported". The AMF 2 then refers to the first associations between a Serving PLMN S-NSSAI and multiple Mapped S-NSSAIs, and distinguishes an association(s) with at least one Mapped S-NSSAI that is not subject to NSSAA from an association(s) with at least one Mapped S-NSSAI that is subject to NSSAA.

In step 203, the AMF 2 sets the association(s) between the Serving PLMN S-NSSAI and the at least one Mapped S-NSSAI that is not subject to NSSAA (hereafter this association is also referred to as the second association) in an Allowed NSSAI Information Element (IE). In addition, AMF 2 sets the association(s) of the Serving PLMN S-NSSAI with the at least one Mapped S-NSSAI that is subject to NSSAA (hereafter this association is also referred to as the third association) in a Pending NSSAI IE. The AMF 2 sends the Allowed NSSAI IE and the Pending NSSAI IE to the UE 1. In other words, the AMF 2 includes not only the Serving PLMN S-NSSAI, but also the Mapped S-NSSAI(s) associated with that Serving PLMN S-NSSAI into the Allowed NSSAI and Pending NSSAI IEs to be sent to the UE 1. The AMF 2 may send the Allowed NSSAI and Pending NSSAI IEs to the UE 1 in a message sent from the AMF 2 to the UE 1 to update the NSSAI Storage or another UE configuration. This message may be a NAS message, or more specifically, a Registration Accept message.

Figure 3:
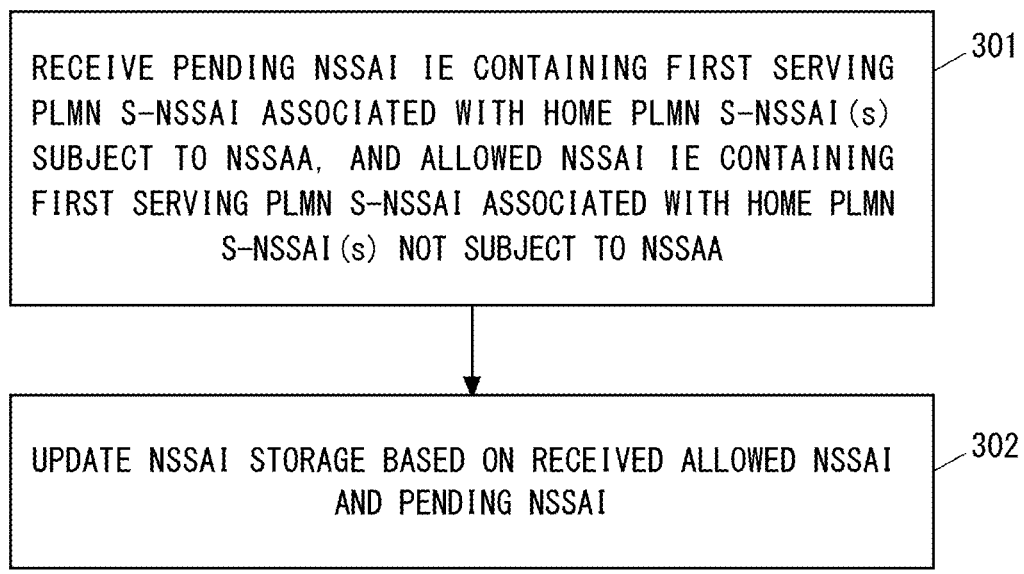
FIG. 3 is a flowchart showing an example of an operation of a UE according to an embodiment.

FIG. 3 is a flowchart showing an example of the operation of the UE 1 related to the flowchart shown in FIG. 2. In step 301, the UE 1 receives Pending NSSAI and Allowed NSSAI IEs from the AMF 2. The Pending NSSAI IE includes an association(s) (third association(s)) between a Serving PLMN S-NSSAI and one or more Mapped S-NSSAIs that are subject to NSSAA. Meanwhile, the Allowed NSSAI IE contains an association(s) (second association(s)) between that Serving PLMN S-NSSAI and one or more Mapped S-NSSAIs that are not subject to NSSAA.

In step 302, in response to the receipt of the Pending NSSAI IE and Allowed NSSAI IE, the UE 1 updates the NSSAI Storage stored in memory of the UE 1. Specifically, the UE 1 replaces or overwrites the Allowed NSSAI in the NSSAI storage with the received Serving PLMN S-NSSAI, and stores the one or more Mapped S-NSSAIs associated with the Serving PLMN S-NSSAI. The UE 1 also replaces or overwrites the Pending NSSAI in the NSSAI storage with the received Serving PLMN S-NSSAI and stores the one or more Mapped S-NSSAIs associated with the Serving PLMN S-NSSAI.

Figure 4:
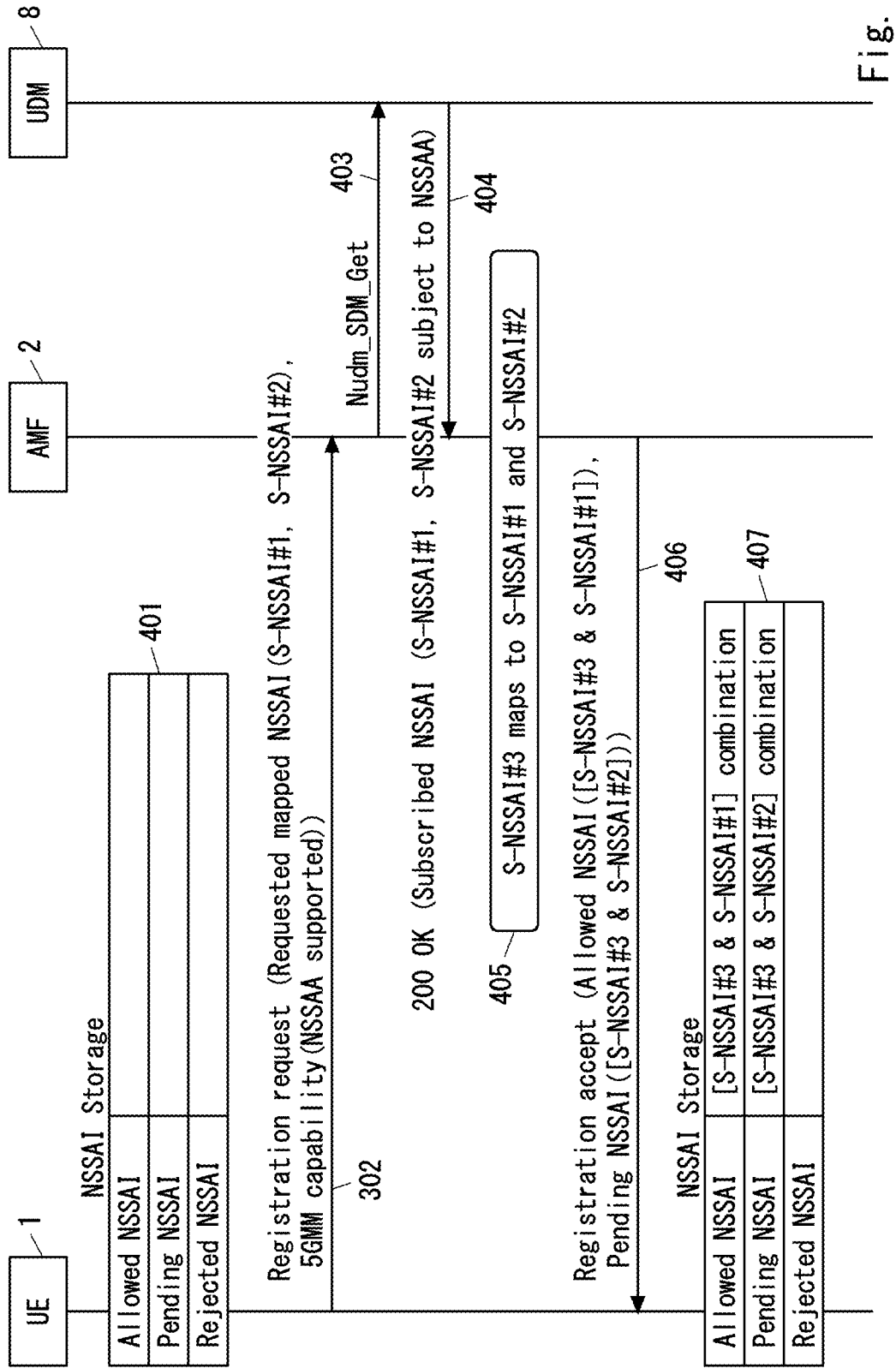
FIG. 4 is a sequence diagram showing an example of operations of a UE, an AMF, and an UDM according to an embodiment.

FIG. 4 shows an example of the procedure for updating the NSSAI Storage of the UE 1. In step 401, both the Allowed NSSAI and the Pending NSSAI in the NSSAI Storage of the UE 1 have no entries. In other words, both the Allowed NSSAI and the Pending NSSAI are empty. In step 402, the UE 1 sends a Registration Request message to the AMF 2. The AMF 2 may be an AMF in a Visited PLMN (VPLMN). The UE 1 includes S-NSSAI #1 and S-NSSAI #2 into a Requested mapped NSSAI IE in the Registration Request message. Specifically, the UE 1 may include S-NSSAI #1 and S-NSSAI #2 in the Requested mapped NSSAI IE based on the Configured NSSAI (or Default Configured NSSAI), which is not shown in the figure. In addition, the Registration Request message indicates that the UE 1 supports the NSSAA. Specifically, the Registration Request message contains a 5GMM Capability IE set to "Network slice-specific authentication and authorization supported".

In step 403, the AMF 2 submits a resource request regarding the Subscribed NSSAI of the UE 1 using a Get operation to the Subscriber Data Management (SDM) service exposed by the UDM 8. The request may be made, for example, via a Nudm_SDM_Get Application Programming Interface (API). In step 404, the UDM 8 returns the Subscribed NSSAI (here S-NSSAI #1, S-NSSAI #2) of the UE 1 to the AMF 2, including it in the message body of a message with the status code 200 OK. The subscribed NSSAI has an AdditionalSnssaiData attribute (or field). This field indicates whether or not each S-NSSAI is subject to NSSAA. Specifically, the field contains a list of attribute (e.g., required Authn Authz) values, each of which indicates whether or not the corresponding S-NSSAI is subject to NSSAA. More specifically, the attribute value for S-NSSAI #1 indicates that S-NSSAI #1 is not subject to NSSAA (e.g., required Authn Authz=false or absent), while the attribute value for S-NSSAI #2 indicates that S-NSSAI #2 is subject to NSSAA (e.g., required Authn Authz=true).

In step 405, the AMF 2 associates a specific Serving PLMN S-NSSAI (here S-NSSAI #3) that the AMF 2 supports (or can serve) with S-NSSAI #1 and S-NSSAI #2. That is, two Mapped S-NSSAIs (S-NSSAI #1, S-NSSAI #2) are associated with S-NSSAI #3. The selection of the specific Serving PLMN S-NSSAI to be associated with S-NSSAI #1 and S-NSSAI #2 may be performed by the NSSF, for example. Specifically, after step 404, the AMF 2 may send S-NSSAI #1 and S-NSSAI #2 to the NSSF. Upon receipt of S-NSSAI #1 and S-NSSAI #2, the NSSF may associate S-NSSAI #1 and S-NSSAI #2 with the specific Serving PLMN S-NSSAI (in this case S-NSSAI #3) and may send this association (i.e., first association) to the AMF 2. The NSSF may send a Configured NSSAI including this first association to the AMF 2.

In step 406, the AMF 2 determines an Allowed NSSAI IE and a Pending NSSAI IE to be sent to the UE 1 based on the NSSAA value in the 5GMM Capability information indicating that the UE 1 supports NSSAA ("Network slice-specific authentication and authorization supported"). Specifically, the AMF 2 sets an association(s) (i.e., second association) between S-NSSAI #3 and a Mapped S-NSSAI(s) that is associated with S-NSSAI #3 and is not subject to NSSAA (here, S-NSSAI #1) to the Allowed NSSAI IE. In addition, in order to update the Pending NSSAI in the NSSAI Storage of the UE 1, the AMF 2 sets an association(s) (i.e., third association) between S-NSSAI #3 and a Mapped S-NSSAI(s) that is associated with S-NSSAI #3 and is subject to NSSAA (here, S-NSSAI #2) to the Pending NSSAI IE. The AMF 2 sends a NAS message (e.g., Registration Accept message) containing the Allowed NSSAI and Pending NSSAI IEs to the UE 1.

In step 407, in response to the receipt of the NAS message, the UE 1 updates the NSSAI Storage stored in memory of the UE 1. Specifically, the UE 1 replaces or overwrites the Allowed NSSAI in the NSSAI storage by the Serving PLMN S-NSSAI (here S-NSSAI #3) included in the received Allowed NSSAI IE, and stores one or more Mapped S-NSSAIs (here S-NSSAI #1) associated with that Serving PLMN S-NSSAI. In other words, the UE 1 stores the combination (or second association) of S-NSSAI #3 with Mapped S-NSSAI(s) (here S-NSSAI #1) not subject to NSSAA, contained in the received Allowed NSSAI IE, into the Allowed NSSAI. The UE 1 also replaces or overwrites the Pending NSSAI in the NSSAI storage by the Serving PLMN S-NSSAI (here S-NSSAI #3) included in the received Pending NSSAI IE, and stores one or more Mapped S-NSSAIs (here S-NSSAI #2) associated with that Serving PLMN S-NSSAI in the NSSAI storage. That is, the UE 1 stores the combination (or third association) of S-NSSAI #3 with Mapped S-NSSAI(s) (here S-NSSAI #2) subject to NSSAA, contained in the received Pending NSSAI IE, into the Pending NSSAI.

Figure 5:
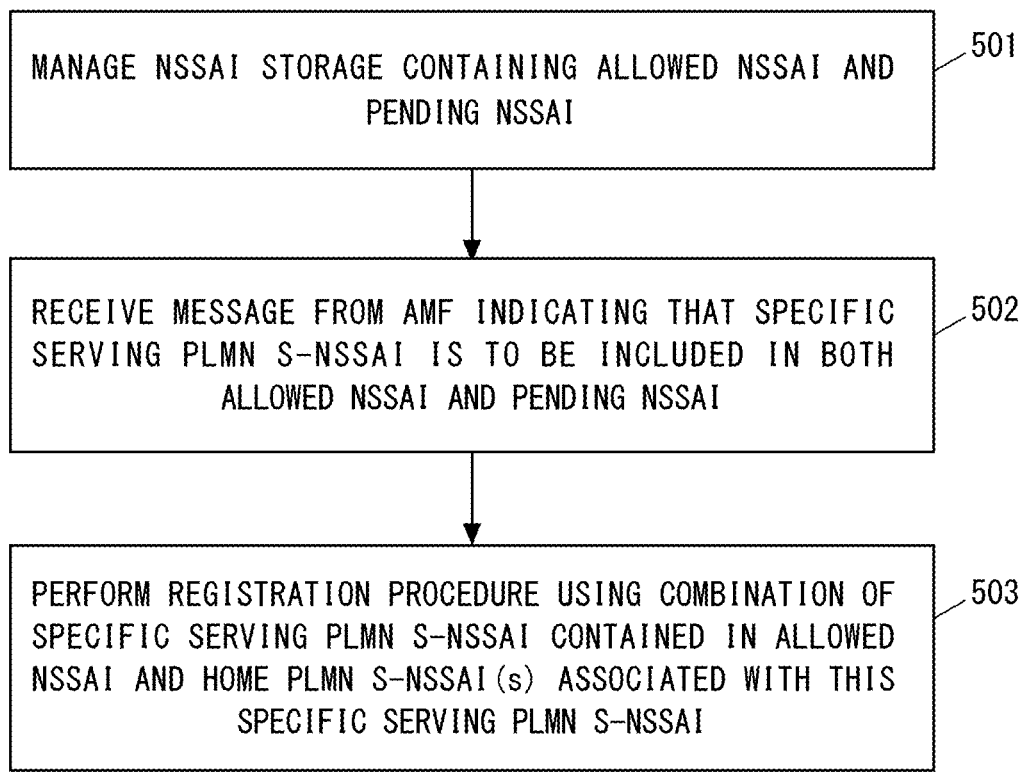
FIG. 5 is a flowchart showing an example of an operation of a UE according to an embodiment.

FIG. 5 is a flowchart showing an example of the operation of the UE 1 in this embodiment. The UE 1 manages its NSSAI Storage, which includes Allowed NSSAI and Pending NSSAI.

In step 502, the UE 1 receives an Allowed NSSAI IE and a Pending NSSAI IE from the AMF 2. The Allowed NSSAI IE indicates a second association(s) between S-NSSAI #3 and a Mapped S-NSSAI(s) (here S-NSSAI #1) that is associated with S-NSSAI #3 and is not subject to NSSAA. On the other hand, the Pending NSSAI IE indicates a third association(s) between S-NSSAI #3 and a Mapped S-NSSAI(s) (here S-NSSAI #2) that is associated with S-NSSAI #3 and is subject to NSSAA.

In step 503, the UE 1 stores the Allowed NSSAI and Pending NSSAI received in step 502 in the Allowed NSSAI and Pending NSSAI of the NSSAI Storage, respectively. Then, when UE 1 performs aa registration procedure, the UE 1 is allowed to set S-NSSAI #3 included in the Allowed NSSAI and the associated Mapped S-NSSAI(s) (here S-NSSAI #1), which are not subject to NSSAA, in a message for the registration procedure. More specifically, even though S-NSSAI #3 is stored in the Pending NSSAI, if S-NSSAI #3 is also stored in the Allowed NSSAI in association with a particular Mapped S-NSSAI(s) (here S-NSSAI #1), then the UE 1 can determine that S-NSSAI #3 is associated with multiple Mapped S-NSSAIs and that the combination of S-NSSAI #3 and a specific Mapped S-NSSAI(s) (i.e., S-NSSAI #1) in the Allowed NSSAI is available in the registration procedure. Accordingly, the UE 1 can set the S-NSSAI #3 and its associated Mapped S-NSSAI(s) (here S-NSSAI #1) into a message for the registration procedure and send it to the network. The message for the registration procedure may be a NAS message, more specifically a Registration Request message for Mobility Registration Update or Periodic Registration Update.

The procedure in this embodiment allows the AMF 2 and UE 1 to properly update one or both of the Pending NSSAI and Allowed NSSAI in the NSSAI storage of the UE 1 when, in a roaming scenario, one Serving PLMN S-NSSAI is associated with multiple Mapped S-NSSAIs and part or all of the multiple Mapped S-NSSAIs are subject to NSSAA. This can contribute to improved slice service availability.

The procedure in this embodiment also allows the UE 1 to use in a registration procedure an association between a Serving PLMN S-NSSAI and a Mapped S-NSSAI(s) indicated by the Allowed NSSAI, if this Serving PLMN S-NSSAI is included in both the Allowed NSSAI and the Pending NSSAI. This can contribute to improved slice service availability. For example, a Serving PLMN S-NSSAI contained in the Pending NSSAI cannot normally be used by the UE 1 for subsequent registration procedures because NSSAA for a Home PLMN S-NSSAI mapped to that Serving PLMN S-NSSAI is ongoing (see, e.g., Section 5.15.5.2.1 of Non-Patent 1). However, in this embodiment, if a Mapped S-NSSAI associated (or in combination) with a Serving PLMN S-NSSAI in the Allowed NSSAI is different from the Mapped S-NSSAI(s) associated with that Serving PLMN S-NSSAI in the Pending NSSAI, then the UE 1 may set the Serving PLMN S-NSSAI and associated Mapped S-NSSAI(s) contained in the Allowed NSSAI in a Registration Request message in a subsequent registration procedure.

Second Embodiment

A configuration example of a radio communication network according to this embodiment may be the same as the example shown in FIG. 1. This embodiment provides another examples of associating a Serving PLMN S-NSSAI with Mapped S-NSSAI(s) by the AMF 2 and updating the NSSAI Storage.

Figure 6:
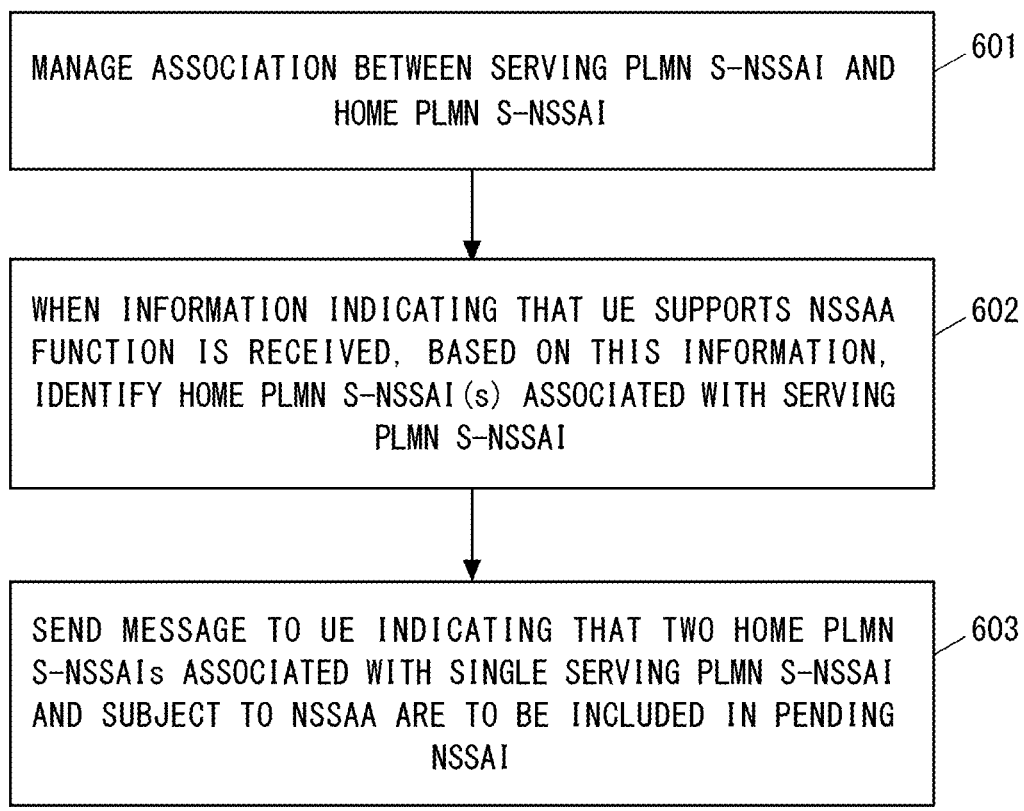
FIG. 6 is a flowchart showing an example of an operation of an AMF according to an embodiment.

FIG. 6 is a flowchart showing an example of the operation of the AMF 2 according to this embodiment. In step 601, the AMF 2 manages (or stores) associations between Serving PLMN S-NSSAIs and Mapped S-NSSAIs (or HPLMN S-NSSAIs). In these associations, one or more Mapped S-NSSAIs may be associated with a single Serving PLMN S-NSSAI (i.e., first association). These one or more Mapped S-NSSAIs may be S-NSSAIs of another PLMN (the HPLMN of the UE 1) that is different from the PLMN to which the AMF 2 belongs. In the first association, at least two Mapped S-NSSAIs subject to NSSAA are associated with the one Serving PLMN S-NSSAI (i.e., third association).

In step 602, the AMF 2 receives a Registration Request message from the UE 1 containing information indicating whether the UE 1 supports the NSSAA function. Based on this information, the AMF 2 identifies (or determines) Mapped S-NSSAI(s) associated with a Serving PLMN S-NSSAI. More specifically, the AMF 2 may determine whether or not the UE 1 supports the NSSAA function based on 5GMM Capability information regarding NSSAA contained in the received Registration Request message. The 5GMM Capability information about NSSAA indicates whether the UE 1 supports the NSSAA function. The 5GMM Capability information about NSSAA may be an NSSAA value included in the 5GMM Capability information. The NSSAA value is an example of information indicating whether NSSAA function is supported. The AMF 2 may recognize that the UE 1 supports the NSSAA function if the NSSAA value indicates "Network slice-specific authentication and authorization supported". The AMF 2 then refers to the first associations between a Serving PLMN S-NSSAI and multiple Mapped S-NSSAIs, and identifies (or selects) at least two associations with at least two Mapped S-NSSAIs that are subject to NSSAA.

In step 603, the AMF 2 sets the associations between the Serving PLMN S-NSSAI and at least two Mapped S-NSSAIs that are subject to NSSAA (third association), out of the first association, into a Pending NSSAI IE for the UE 1. The AMF 2 sends the Pending NSSAI IE to the UE 1. In other words, the AMF 2 includes not only the Serving PLMN S-NSSAI, but also the Mapped S-NSSAIs associated with that Serving PLMN S-NSSAI into the Pending NSSAI IEs to be sent to the UE 1. The AMF 2 may send the Pending NSSAI IE to the UE 1 in a message sent from the AMF 2 to the UE 1 to update the NSSAI Storage or another UE configuration. This message may be a NAS message, or more specifically, a Registration Accept message.

Figure 7:
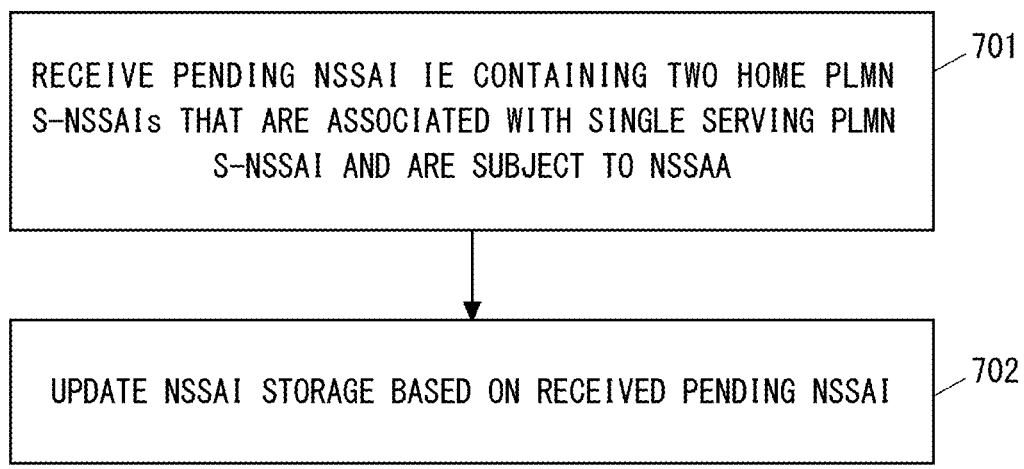
FIG. 7 is a flowchart showing an example of an operation of a UE according to an embodiment.

FIG. 7 is a flowchart showing an example of the operation of the UE 1 related to the flowchart shown in FIG. 6. In step 701, the UE 1 receives a Pending NSSAI IE from the AMF 2. The Pending NSSAI IE includes associations (third associations) between a Serving PLMN S-NSSAI and at least two Mapped S-NSSAIs that are subject to NSSAA.

In step 702, in response to the receipt of the Pending NSSAI IE, the UE 1 updates the NSSAI Storage stored in memory of the UE 1. Specifically, the UE 1 replaces or overwrites the Pending NSSAI in the NSSAI storage with the received Serving PLMN S-NSSAI and stores the two or more Mapped S-NSSAIs associated with the Serving PLMN S-NSSAI.

Figure 8:
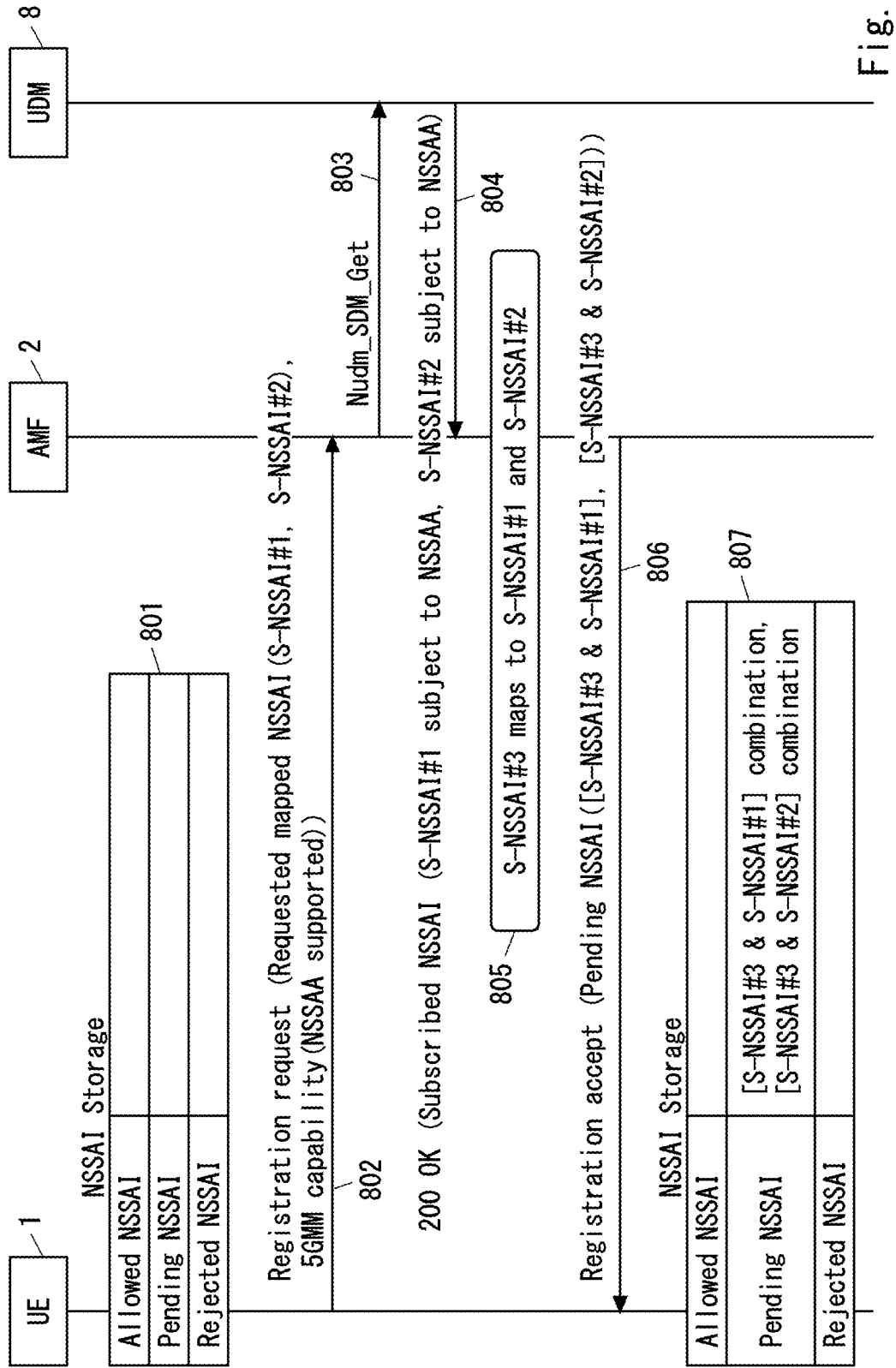
FIG. 8 is a sequence diagram showing an example of operations of a UE, an AMF, and an UDM according to an embodiment.

FIG. 8 shows an example of the procedure for updating the NSSAI Storage of the UE 1. In step 801, the Pending NSSAI in the NSSAI Storage of the UE 1 has no entries. In other words, the Pending NSSAI is empty. In step 802, the UE 1 sends a Registration Request message to the AMF 2. The AMF 2 may be an AMF in a Visited PLMN (VPLMN). The UE 1 includes S-NSSAI #1 and S-NSSAI #2 into a Requested mapped NSSAI IE in the Registration Request message. In addition, the Registration Request message indicates that the UE 1 supports the NSSAA. Specifically, the Registration Request message contains a 5GMM Capability IE set to "Network slice-specific authentication and authorization supported".

In step 803, the AMF 2 submits a resource request regarding the Subscribed NSSAI of the UE 1 using a Get operation to the SDM service exposed by the UDM 8. The request may be made, for example, via a Nudm_SDM_Get API. In step 804, the UDM 8 returns the Subscribed NSSAI (here S-NSSAI #1, S-NSSAI #2) of the UE 1 to the AMF 2, including it in the message body of a message with the status code 200 OK. The subscribed NSSAI has an Additional-SnssaiData attribute (or field). This field indicates whether or not each S-NSSAI is subject to NSSAA. Specifically, the field contains a list of attribute (e.g., required Authn Authz) values, each of which indicates whether or not the corresponding S-NSSAI is subject to NSSAA. More specifically, each of the two attribute values for S-NSSAI #1 and S-NSSAI #2 indicates that NSSAA is imposed (e.g., required Authn Authz=true).

In step 805, the AMF 2 associates a specific Serving PLMN S-NSSAI (here S-NSSAI #3) that the AMF 2 supports (or can serve) with S-NSSAI #1 and S-NSSAI #2. That is, two Mapped S-NSSAIs (S-NSSAI #1, S-NSSAI #2) are associated with S-NSSAI #3. The selection of the specific Serving PLMN S-NSSAI to be associated with S-NSSAI #1 and S-NSSAI #2 may be performed by the NSSF, for example. Specifically, after step 304, the AMF 2 may send S-NSSAI #1 and S-NSSAI #2 to the NSSF. Upon receipt of S-NSSAI #1 and S-NSSAI #2, the NSSF may associate S-NSSAI #1 and S-NSSAI #2 with the specific Serving PLMN S-NSSAI (in this case S-NSSAI #3) and may send this association (i.e., first association) to the AMF 2. The NSSF may send a Configured NSSAI including this first association to the AMF 2.

In step 806, the AMF 2 determines a Pending NSSAI IE to be sent to the UE 1 based on the NSSAA value in the 5GMM Capability information indicating that the UE 1 supports NSSAA ("Network slice-specific authentication and authorization supported"). Specifically, in order to update the Pending NSSAI in the NSSAI Storage of the UE 1, the AMF 2 sets associations (i.e., third associations) between S-NSSAI #3 and two Mapped S-NSSAIs that are subject to NSSAA (here, S-NSSAI #1 and S-NSSAI #2) to the Pending NSSAI IE. These third associations include the combination of S-NSSAI #3 and S-NSSAI #1, and further include the combination of S-NSSAI #3 and S-NSSAI #2. The AMF 2 sends a NAS message (e.g., Registration Accept message) containing the Pending NSSAI IE to the UE 1.

In step 807, in response to the receipt of the NAS message, the UE 1 updates the NSSAI Storage stored in memory of the UE 1. Specifically, the UE 1 replaces or overwrites the Pending NSSAI in the NSSAI storage by the received Serving PLMN S-NSSAI (here S-NSSAI #3), and stores Mapped S-NSSAIs (here S-NSSAI #1 and S-NSSAI #2) associated with that Serving PLMN S-NSSAI. In other words, the UE 1 stores the combinations (or third associations) of S-NSSAI #3 with Mapped S-NSSAIs (here S-NSSAI #1 and S-NSSAI #2) subject to NSSAA, contained in the received Pending NSSAI IE, into the Pending NSSAI.

Figure 9:
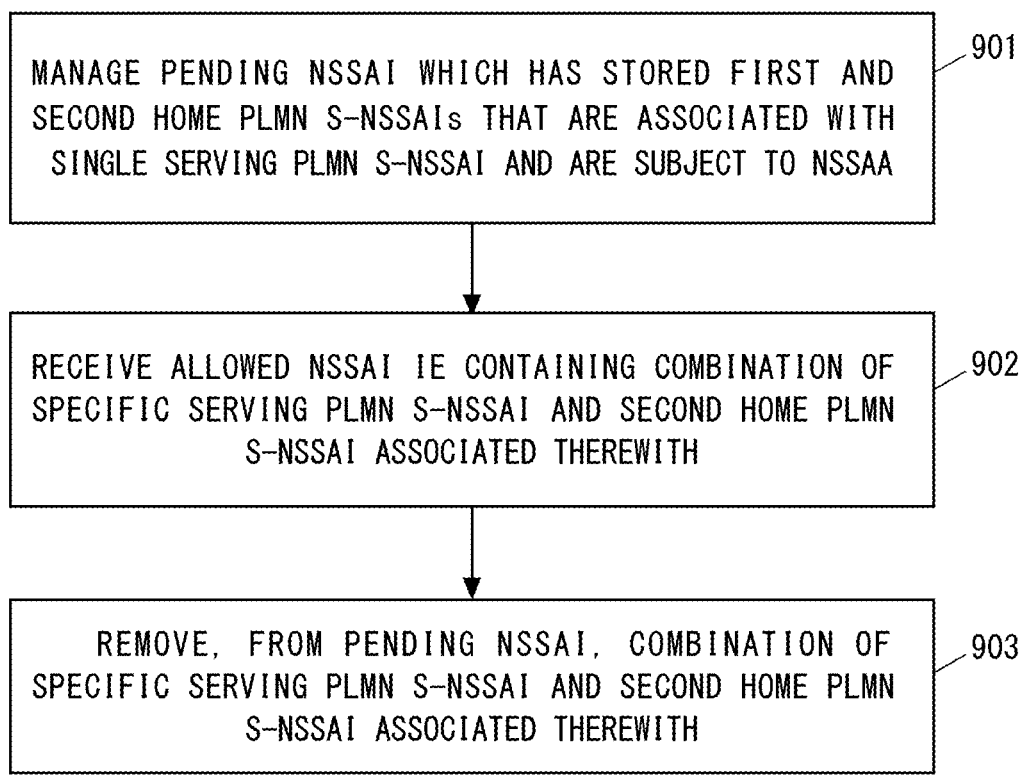
FIG. 9 is a flowchart showing an example of an operation of a UE according to an embodiment.

FIG. 9 shows an example of an NSSAI Storage update procedure when an NSSAA procedure for one Mapped S-NSSAI (here S-NSSAI #2) is successfully completed after the procedure in FIG. 8. In step 901, the UE 1 manages the NSSAI Storage, which includes the Allowed NSSAI and the Pending NSSAI. The Pending NSSAI at this point has stored the first and second Mapped S-NSSAIs (i.e., S-NSSAI #1 and S-NSSAI #2) associated with the specific Serving PLMN S-NSSAI and subject to NSSAA.

In step 902, the UE 1 receives from the AMF 2 an Allowed NSSAI IE containing the combination of the specific Serving PLMN S-NSSAI and the associated second Mapped S-NSSAI (in this case S-NSSAI #2). In step 903, the UE 1 removes the combination received in step 902 from the Pending NSSAI in the NSSAI storage and stores this combination into the Allowed NSSAI.

Figure 10:
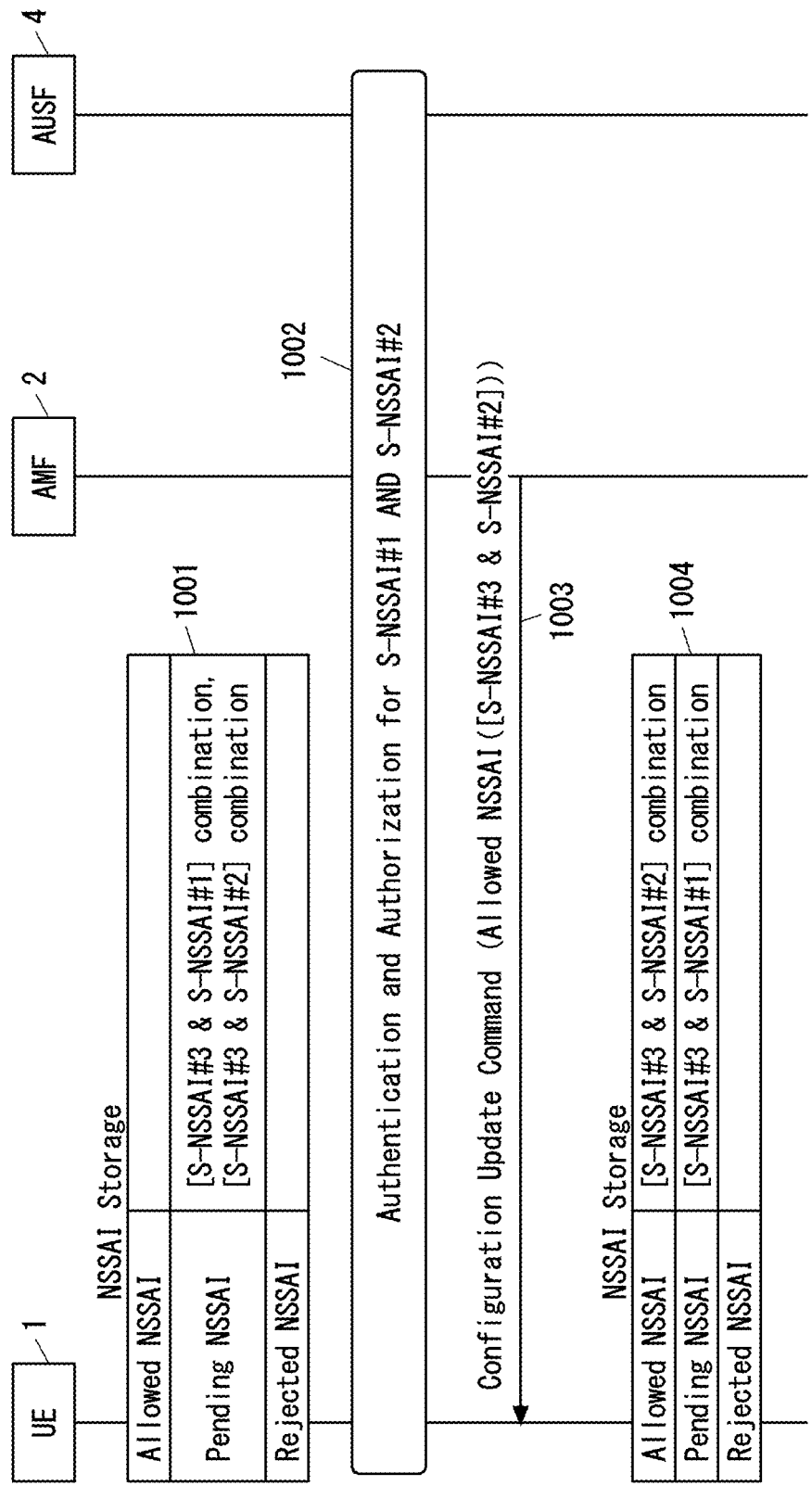
FIG. 10 is a sequence diagram showing an example of operations of a UE, an AMF, and an UDM according to an embodiment.

FIG. 10 shows an example of an NSSAI Storage update procedure when NSSAA procedures are performed for two Mapped S-NSSAIs (here S-NSSAI #1 and S-NSSAI #2) associated with one Serving PLMN S-NSSAI, and the NSSAA procedure for S-NSSAI #2 is completed successfully first. In step 1001, the UE 1 manages the Pending NSSAI. The Pending NSSAI at this point has stored the combination of the Serving PLMN S-NSSAI (here S-NSSAI #3) with a Mapped S-NSSAI (here S-NSSAI #1) and the combination of the Serving PLMN S-NSSAI (S-NSSAI #3) with another Mapped S-NSSAI (here S-NSSAI #2).

In step 1002, the authentication and authorization procedures for S-NSSAI #1 and S-NSSAI #2 are performed. In step 1003, the authentication and authorization procedure for S-NSSAI #2 succeeds. Accordingly, the AMF 2 sets S-NSSAI #3 and S-NSSAI #2 associated with S-NSSAI #3 into an Allowed NSSAI IE and sends a Configuration Update Command message containing this Allowed NSSAI IE to the UE 1. With this message, the AMF 2 indicates to the UE 1 that S-NSSAI #3 and S-NSSAI #2 associated with S-NSSAI #3 are to be included in the Allowed NSSAI.

In step 1004, in response to receiving the Allowed NSSAI IE, the UE 1 updates the NSSAI Storage stored in memory of the UE 1. Specifically, the UE 1 deletes the combination of S-NSSAI #3 and S-NSSAI #2, indicated by the Allowed NSSAI IE received in step 1003, from the Pending NSSAI in the NSSAI storage and stores this combination into the Allowed NSSAI.

The procedure in this embodiment can address the case where one Serving PLMN S-NSSAI is associated with two Mapped S-NSSAIs that are both subject to NSSAA in a roaming scenario. The procedure in this embodiment allows UE 1 to accurately update the NSSAI Storage without being affected by these two Mapped S-NSSAIs being mapped to the same Serving PLMN S-NSSAI. For example, if a Serving PLMN S-NSSAI is associated with a first Mapped S-NSSAI and a second Mapped S-NSSAI, and if the authentication and authorization procedure for the second Mapped S-NSSAI is successful, the AMF 2 sends a message to the UE 1 causing an update of the NSSAI Storage. This message contains not only the Serving PLMN S-NSSAI, but also information on the second Mapped S-NSSAI that is mapped to the Serving PLMN S-NSSAI. This allows the UE 1 to determine that the combination of the Serving PLMN S-NSSAI and the second Mapped S-NSSAI contained in the NSSAI Storage should be updated, and to update the NSSAI Storage with respect to that combination.

Third Embodiment

This embodiment provides a modification to the second embodiment. A configuration example of a radio communication network according to this embodiment may be the same as the example shown in FIG. 1.

Figure 11:
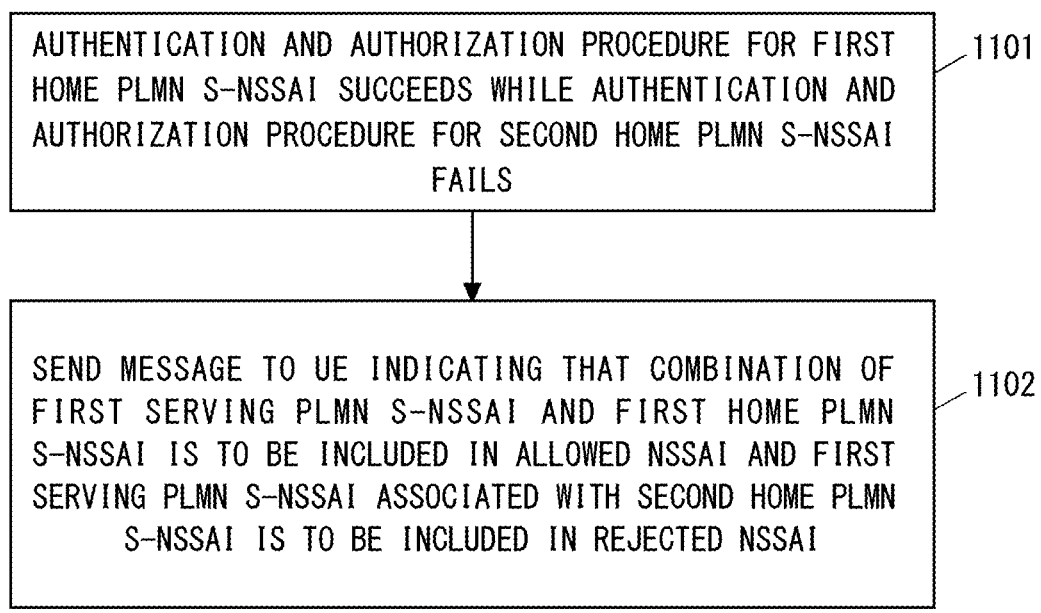
FIG. 11 is a flowchart showing an example of an operation of an AMF according to an embodiment.

FIG. 11 is a flowchart showing an example of the operation of the AMF 2 according to this embodiment. In step 1101, authentication and authorization procedures are performed for first and second Mapped S-NSSAIs both associated with a first Serving PLMN S-NSSAI and subject to NSSAA. As a result, the authentication and authorization procedure for the first Mapped S-NSSAI succeeds while the authentication and authorization procedure for the second Mapped S-NSSAI fails.

In step 1102, AMF 2 sets the combination of the first Serving PLMN S-NSSAI and the first Mapped S-NSSAI associated with the first Serving PLMN S-NSSAI to Allowed NSSAI IE and also sets the first Serving PLMN S-NSSAI into Rejected NSSAI. The AMF 2 sends a message containing these Allowed NSSAI and Rejected NSSAI to the UE 1.

Figure 12:
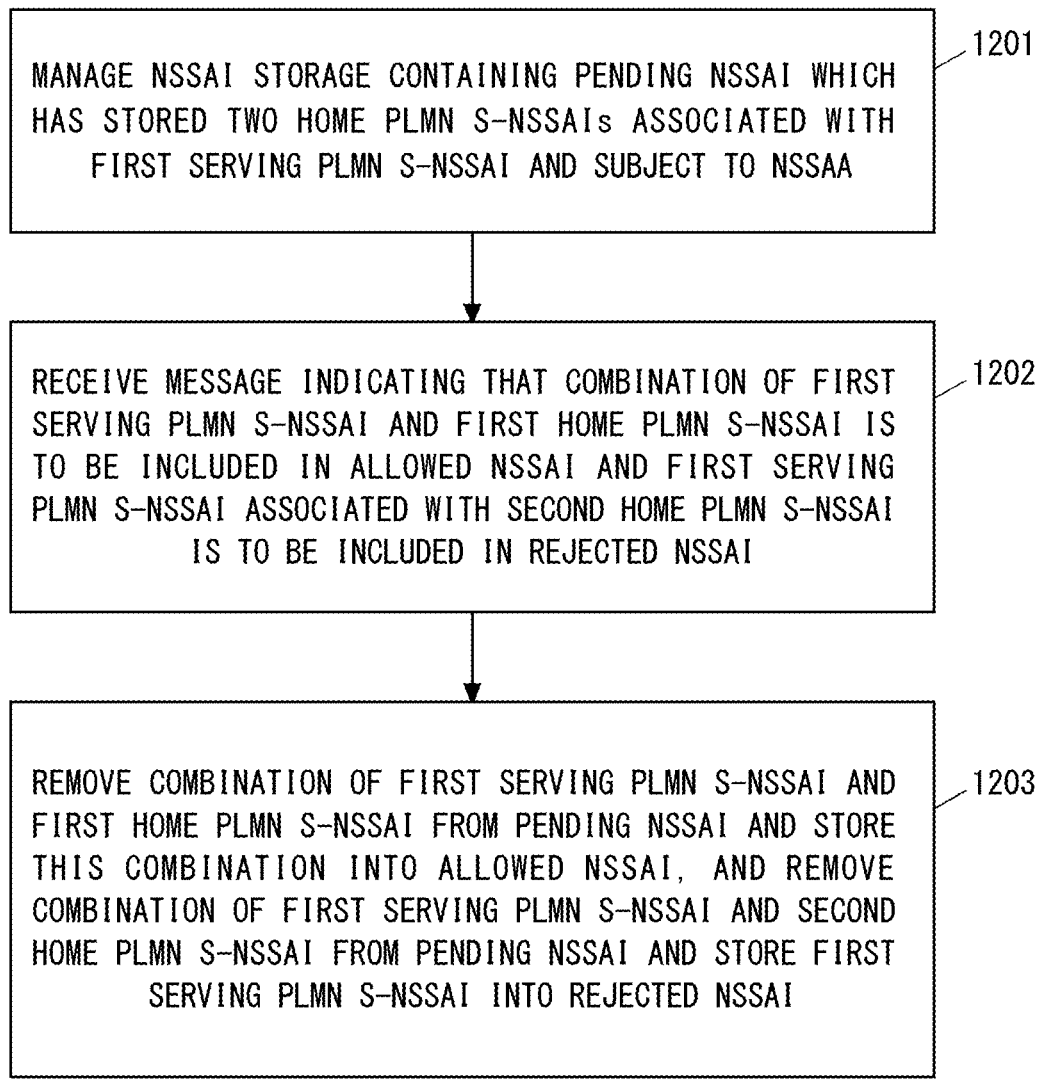
FIG. 12 is a flowchart showing an example of an operation of a UE according to an embodiment.

FIG. 12 is a flowchart showing an example of the operation of the UE 1 related to the flowchart shown in FIG. 11. In step 1201, the UE 1 manages the NSSAI Storage, which contains the Pending NSSAI. The Pending NSSAI at this point has stored the combinations (or associations, or mappings) of a first Serving PLMN S-NSSAI with two Mapped S-NSSAIs (i.e., S-NSSAI #1 and S-NSSAI #2) associated with the first Serving PLMN S-NSSAI and subject to NSSAA.

In step 1202, the authentication and authorization procedure for the first Mapped S-NSSAI succeeds, while the authentication and authorization procedure for the second Mapped S-NSSAI fails. The UE 1 then receives a message from the AMF 2 containing an Allowed NSSAI IE and Rejected NSSAI. The Allowed NSSAI IE contains the combination of the first Serving PLMN S-NSSAI and the first Mapped S-NSSAI. Meanwhile, the Rejected NSSAI IE includes the first Serving PLMN S-NSSAI.

In step 1203, the UE 1 removes the combination of the first Serving PLMN S-NSSAI and the first Mapped S-NSSAI, indicated by the Allowed NSSAI IE received in step 1202, from the Pending NSSAI and stores this combination into the Allowed NSSAI. In addition, the UE 1 removes the combination of the first Serving PLMN S-NSSAI and the second Mapped S-NSSAI from the Pending NSSAI and stores the first Serving PLMN S-NSSAI in the Rejected NSSAI.

Figure 13:
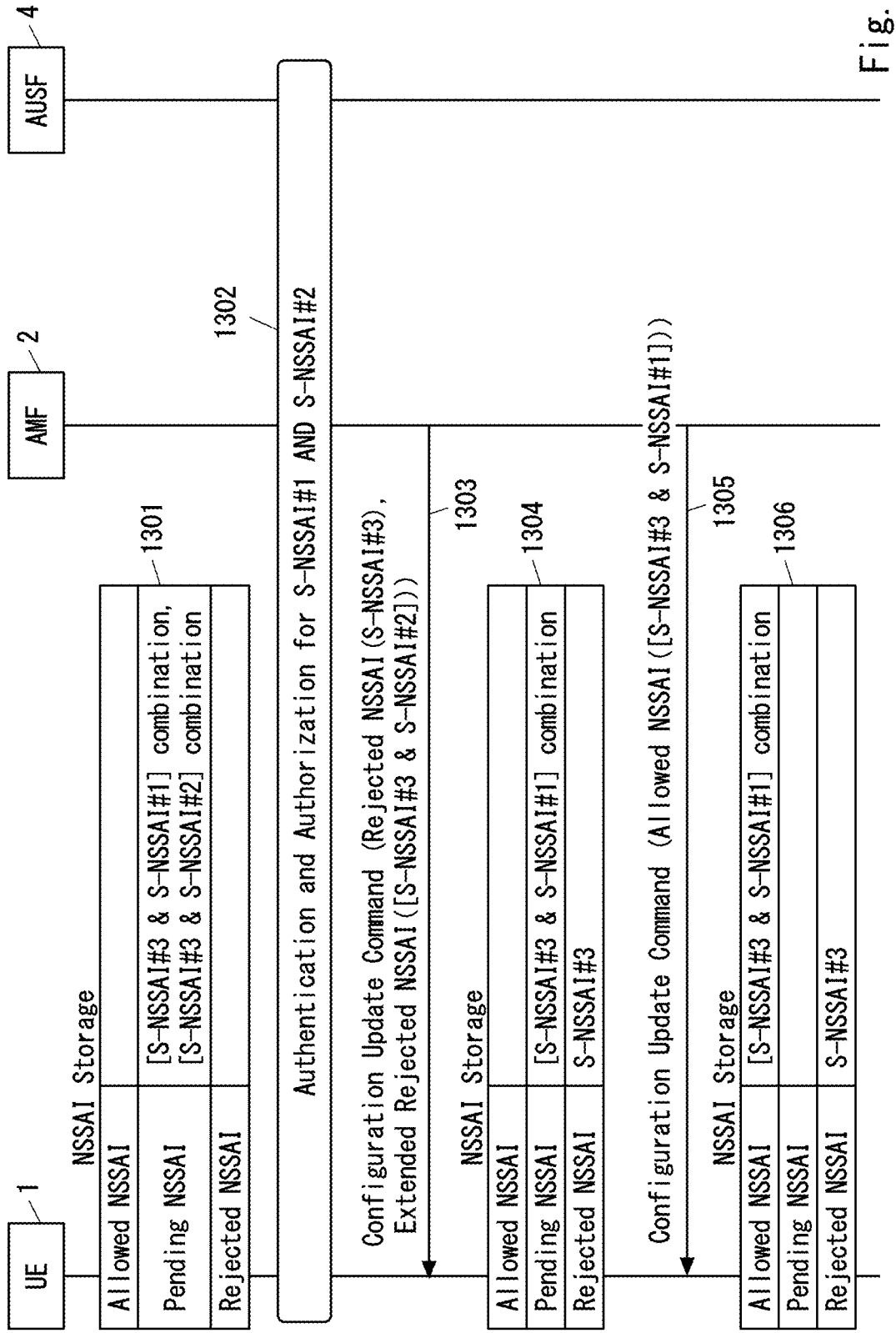
FIG. 13 is a sequence diagram showing an example of operations of a UE, an AMF, and an UDM according to an embodiment.

FIG. 13 shows an example of an NSSAI Storage update procedure when NSSAA procedures are performed for two Mapped S-NSSAIs associated with one Serving PLMN S-NSSAI, and the NSSAA procedure for one Mapped S-NSSAI fails and the NSSAA procedure for the other Mapped S-NSSAI succeeds. In step 1301, the UE 1 manages the Pending NSSAI. The Pending NSSAI at this point has stored the combination (or association, mapping) of the Serving PLMN S-NSSAI (here S-NSSAI #3) with a Mapped S-NSSAI(s) (here S-NSSAI #1), and the combination (or association, mapping) of the Serving PLMN S-NSSAI with another Mapped S-NSSAI(s) (here S-NSSAI #2).

In step 1302, the authentication and authorization procedures for S-NSSAI #1 and S-NSSAI #2 are performed. In step 1303, the authentication and authorization procedure for S-NSSAI #2 fails and the AMF 2 sends a Configuration Update Command message to the UE 1 to indicate that S-NSSAI #3 is to be included in the Rejected NSSAI. This message contains a Rejected NSSAI IE and an Extended Rejected NSSAI IE. The Rejected NSSAI IE indicates a Serving PLMN S-NSSAI (here S-NSSAI #3) that needs to be stored in the Rejected NSSAI. The extended Rejected NSSAI indicates a Serving PLMN S-NSSAI (here S-NSSAI #3) that needs to be stored in the Rejected NSSAI, and also indicates a Mapped S-NSSAI(s) (here S-NSSAI #2) that is associated with S-NSSAI #3. The Extended Rejected NSSAI allows the UE 1 to determine the combination of a Serving PLMN S-NSSAI and a Mapped S-NSSAI(s) that needs to be removed from the Pending NSSAI. The extended Rejected NSSAI IE may be modified as follows. The Extended Rejected NSSAI IE may not be specified as an information element independent of the Rejected NSSAI IE, but may be specified as an Extended Rejected NSSAI by extending the format of the Rejected NSSAI IE. In this case, the extension of the Rejected NSSAI IE needs to be made in a manner that guarantees backward compatibility.

Step 1303 may be modified as follows. The message of step 1303 may include a Pending NSSAI IE instead of the extended Rejected NSSAI IE. More specifically, the message may include the Rejected NSSAI IE and the Pending NSSAI IE. The Rejected NSSAI IE includes S-NSSAI #3. On the other hand, the Pending NSSAI IE includes a combination of S-NSSAI #3 and S-NSSAI #1. In other words, when the AMF 2 moves a Serving PLMN S-NSSAI having combinations with multiple Mapped S-NSSAIs to the Rejected NSSAI, it explicitly indicates to the UE 1 one or more Mapped S-NSSAIs that are mapped to that Serving PLMN S-NSSAI but are either allowed to the UE 1 or pending for NSSAA. This allows the UE 1 to recognize that although the Serving PLMN S-NSSAI having combinations with multiple Mapped S-NSSAIs is moved to Rejected NSSAI, the Serving PLMN S-NSSAI is still allowed, or pending for NSSAA, with respect to a subset of these multiple Mapped S-NSSAIs.

In step 1304, the UE 1 removes S-NSSAI #3 and S-NSSAI #2 associated with S-NSSAI #3 from the Pending NSSAI and stores S-NSSAI #3 in the Rejected NSSAI.

In step 1305, the authentication and authorization procedure for S-NSSAI #1 succeeds (the authentication and authorization procedure for S-NSSAI #1 is omitted in FIG. 13). In response, the AMF 2 sends a Configuration Update Command message to the UE 1 to indicate that the combination of S-NSSAI #3 and S-NSSAI #1 is to be included in the Allowed NSSAI. This message contains an Allowed NSSAI IE indicating the combination of S-NSSAI #3 and S-NSSAI #1.

In step 1306, the UE 1 removes the combination of S-NSSAI #3 and S-NSSAI #1, associated with S-NSSAI #3, from the Pending NSSAI according to the received Allowed NSSAI IE and stores this combination into the Allowed NSSAI.

The order of the steps shown in FIG. 13 is just an example. For example, step 1305 and step 1306 may occur simultaneously with step 1303 and step 1304, or they may occur prior to these steps.

FIG. 14 and FIG. 15 provide an example of the format of the extended Rejected NSSAI IE. FIG. 14 shows the list of parameters to be set in the extended Rejected NSSAI IE. FIG. 14 is based on Section 9.11.3.37 of Non-Patent Literature 3. In the example in FIG. 14, the Extended Rejected NSSAI IE includes an NSSAI IE Identifier (IEI) field 1401, a Length of S-NSSAI contents field 1402, and one or more S-NSSAI value fields 1403. The NSSAI IEI field 1401 contains an identifier identifying the extended Rejected NSSAI IE. The Length of S-NSSAI contents field 1402 indicates the length in octets of the contents contained in the extended Rejected NSSAI IE.

FIG. 15 shows a format of the S-NSSAI value field 1403 shown in FIG. 14. As FIG. 15 shows, the S-NSSAI value field 1403 set in the extended Rejected NSSAI IE includes fields 1501 indicating the SST and SD of a Serving PLMN S-NSSAI and fields 1502 indicating the SST and SD of a Mapped S-NSSAI associated with that Serving PLMN S-NSSAI. The extended Rejected NSSAI IE described with respect to the procedure in FIG. 13 may be configured as shown in FIGS. 14 and 15.

The procedure in this embodiment can deal with the case where, in a roaming scenario, a Serving PLMN S-NSSAI is associated with two Mapped S-NSSAIs that are both subject to NSSAA, and the authentication and authorization procedure for one of these two Mapped S-NSSAIs is successful, but the authentication and authorization procedures for the other one fails. The procedure in this embodiment allows the UE 1 to accurately update the NSSAI Storage without being affected by these two Mapped S-NSSAIs being mapped to the same Serving PLMN S-NSSAI. For example, if a Serving PLMN S-NSSAI is associated with a first Mapped S-NSSAI and a second Mapped S-NSSAI, and the authentication and authorization procedure for the second Mapped S-NSSAI fails, then the AMF 2 sends a message to the UE 1 causing an update of the NSSAI Storage. This message includes not only the Serving PLMN S-NSSAI(s) to be set into the Rejected NSSAI IE, but also Mapped S-NSSAI(s) that is associated with that Serving PLMN S-NSSAI and is rejected (or is not rejected). This allows the UE 1 to determine that the combination of the Serving PLMN S-NSSAI and the second Mapped S-NSSAI associated with that Serving PLMN S-NSSAI in the Pending NSSAI of the NSSAI Storage should be updated, and to update the NSSAI Storage for that combination.

Fourth Embodiment

A configuration example of a radio communication network according to this embodiment may be the same as the example shown in FIG. 1. This embodiment provides an example of NSSAI Storage update when an authorization revocation occurs. This embodiment uses the extended Rejected NSSAI described in FIGS. 13, 14, and 15.

Figure 16:
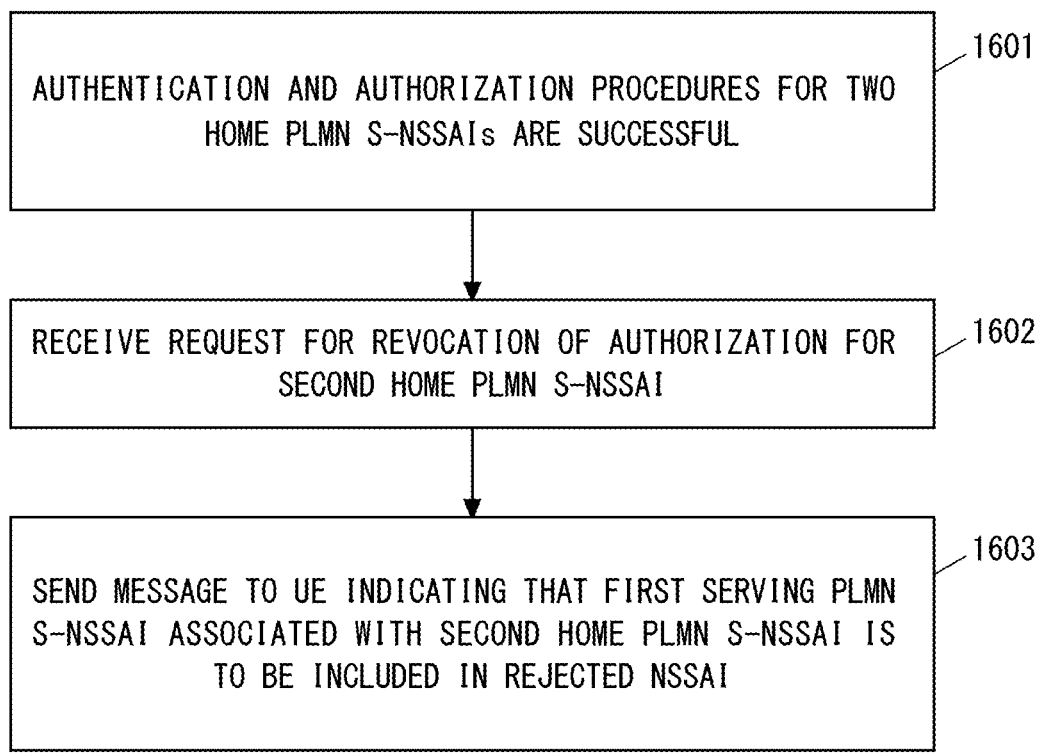
FIG. 16 is a flowchart showing an example of an operation of an AMF according to an embodiment.

FIG. 16 is a flowchart showing an example of the operation of the AMF 2 according to this embodiment. In step 1601, the AMF 2 manages (or stores) associations of Serving PLMN S-NSSAIs with Mapped S-NSSAIs (or HPLMN S-NSSAIs). In the associations, one Serving PLMN S-NSSAI is associated with two Mapped S-NSSAIs (here first and second Mapped S-NSSAIs) that are subject to NSSAA. In addition, authentication and authorization procedures for these two Mapped S-NSSAIs have been successfully completed.

In step 1602, the AMF 2 receives from the AUSF 4 a request for revocation of authorization for the second Mapped S-NSSAI. The AMF 2 may receive the revocation request from an Authentication, Authorization, and Accounting (AAA) Server. In response, in step 1603, the AMF 2 sends a message to the UE 1 containing an extended Rejected NSSAI that includes the first Serving PLMN S-NSSAI associated with the second Mapped S-NSSAI and that second Mapped S-NSSAI. This message may be a message sent from the AMF 2 to the UE 1 to update the NSSAI Storage or another UE configuration. This message may be a NAS message, or more specifically, a Configuration Update Command message.

Figure 17:
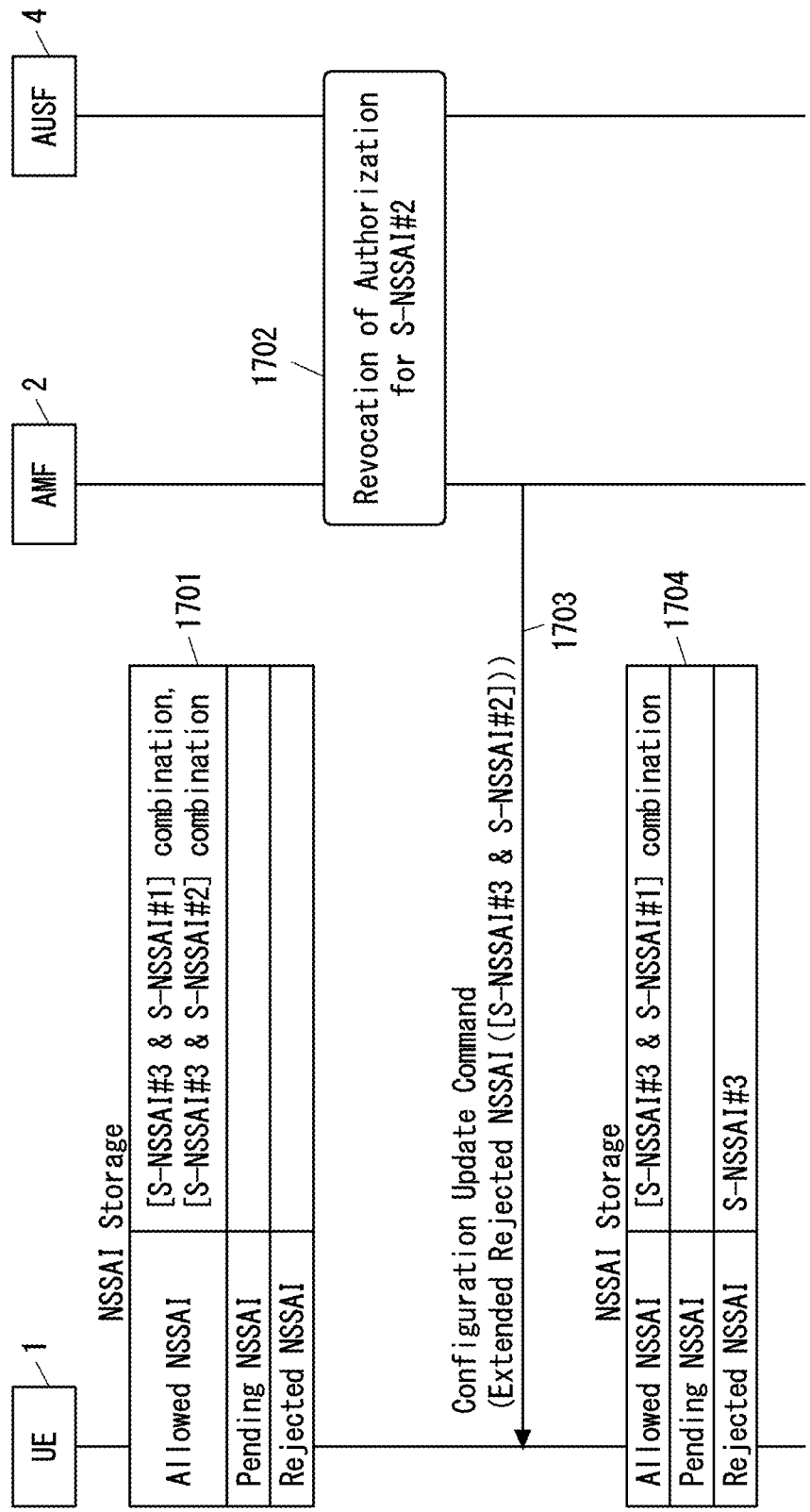
FIG. 17 is a sequence diagram showing an example of operations of a UE, an AMF, and an UDM according to an embodiment.

FIG. 17 shows an example of the NSSAI Storage update procedure when the NSSAA procedures for two Mapped S-NSSAIs associated with one Serving PLMN S-NSSAI have been successfully completed, followed by a request for revocation of authorization for one of the Mapped S-NSSAIs. In step 1701, the UE 1 manages the Allowed NSSAI. The Allowed NSSAI at this point has stored the combination (or association, mapping) of a Serving PLMN S-NSSAI (here S-NSSAI #3) with a Mapped S-NSSAI (here S-NSSAI #1), and the combination (or association, mapping) of that Serving PLMN S-NSSAI with another Mapped S-NSSAI (here S-NSSAI #2) are stored.

In step 1702, revocation of the authorization of S-NSSAI #2 is performed. The AMF 2 is requested by the AUSF 4 (or the AAA server) to revoke the authorization of S-NSSAI #2. In response, in step 1703, the AMF 2 sends a Configuration Update Command message to the UE 1 to indicate that S-NSSAI #3 is to be included in the Rejected NSSAI. This message contains an Extended Rejected NSSAI IE. The Extended Rejected NSSAI indicates the Serving PLMN S-NSSAI (here S-NSSAI #3) that needs to be stored in the Rejected NSSAI, and also indicates the Mapped S-NSSAI (here S-NSSAI #2) associated with S-NSSAI #3. The Extended Rejected NSSAI allows the UE 1 to determine the combination of a Serving PLMN S-NSSAI and a Mapped S-NSSAI(s) that should be removed from the Pending NSSAI.

Step 1703 may be modified as follows. The message of step 1703 may include an Allowed NSSAI IE instead of the extended Rejected NSSAI IE. More specifically, the message may include a Rejected NSSAI IE and an Allowed NSSAI IE. The Rejected NSSAI IE includes S-NSSAI #3. On the other hand, the Allowed NSSAI IE includes a combination of S-NSSAI #3 and S-NSSAI #1. In other words, when the AMF 2 moves a Serving PLMN S-NSSAI having combinations with multiple Mapped S-NSSAIs to the Rejected NSSAI, it explicitly indicates to the UE 1 one or more Mapped S-NSSAIs that are mapped to that Serving PLMN S-NSSAI but are either allowed to the UE 1 or pending for NSSAA. This allows the UE 1 to recognize that although the Serving PLMN S-NSSAI having combinations with multiple Mapped S-NSSAIs is moved to Rejected NSSAI, the Serving PLMN S-NSSAI is still allowed, or pending for NSSAA, with respect to a subset of these multiple Mapped S-NSSAIs.

The format of the extended Rejected NSSAI in this embodiment may be the same as the example shown in FIGS. 14 and 15.

The procedure in this embodiment can deal with the case where, in a roaming scenario, NSSAA procedures for two Mapped S-NSSAIs mapped to the same Serving PLMN S-NSSAI are successfully completed, and then a revocation request for one of the Mapped S-NSSAIs occurs. The procedure in this embodiment allows the UE 1 to accurately update the NSSAI Storage without being affected by these two Mapped S-NSSAIs being mapped to the same Serving PLMN S-NSSAI. For example, after successful completion of the authorization and authorization procedures for the first and second Mapped S-NSSAI associated with one Serving PLMN S-NSSAI, if the AMF 2 receives a revocation request for the authorization for the second Mapped S-NSSAI, the AMF 2 sends a message to the UE 1 to update the NSSAI Storage. This message includes not only the Serving PLMN S-NSSAI(s) to be set into the Rejected NSSAI IE, but also Mapped S-NSSAI(s) that is associated with that Serving PLMN S-NSSAI and whose authorization has been (or has not yet been) revoked. This allows the UE 1 to determine that the combination of the Serving PLMN S-NSSAI and the second Mapped S-NSSAI associated with that Serving PLMN S-NSSAI in the Allowed NSSAI of the NSSAI Storage should be updated, and to update the NSSAI Storage for that combination.

Fifth Embodiment

A configuration example of a radio communication network according to this embodiment may be the same as the example shown in FIG. 1. This embodiment provides an operation of the UE 1 for a registration procedure. The operation of the UE 1 described in this embodiment may be implemented in combination with any of the embodiments described above.

Figure 18:
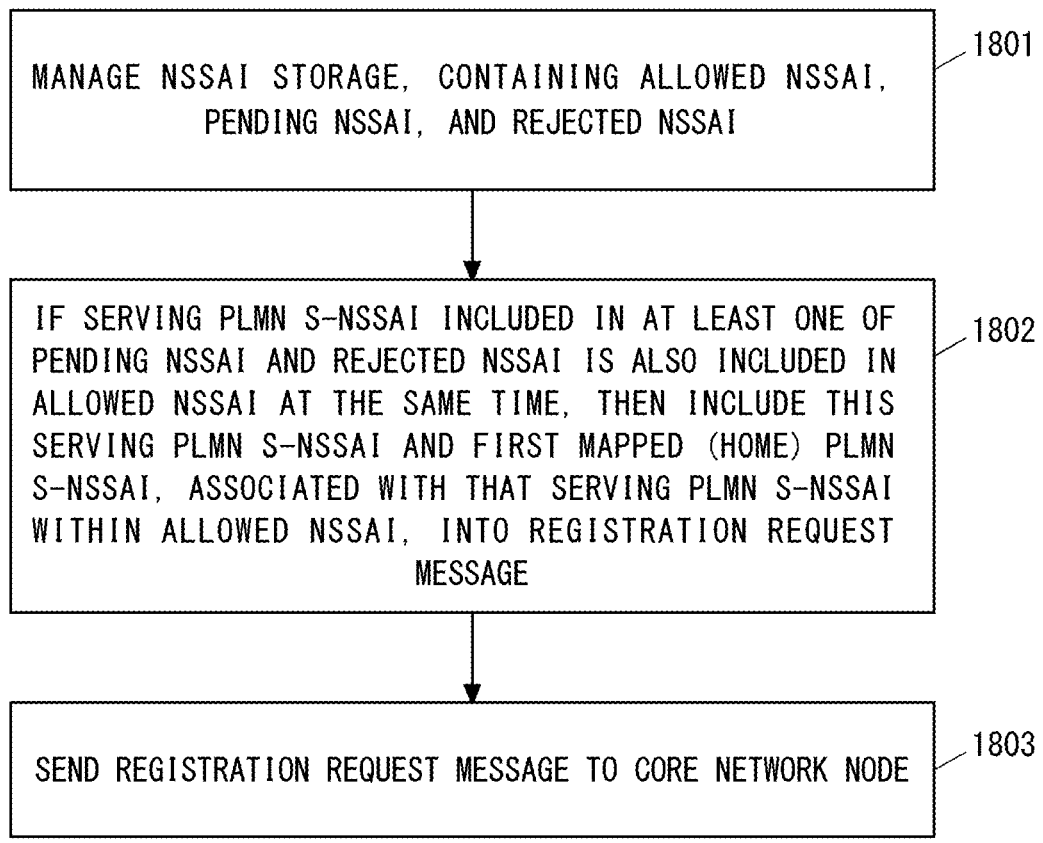
FIG. 18 is a flowchart showing an example of an operation of a UE according to an embodiment.

FIG. 18 shows an example of the operation of the UE 1 in this embodiment. In step 1801, the UE 1 manages its NSSAI storage, including Allowed NSSAI, Pending NSSAI, and Rejected NSSAI. In step 1802, if a Serving PLMN S-NSSAI included in at least one of the Pending NSSAI and Rejected NSSAI is also included in the Allowed NSSAI at the same time, then the UE 1 includes the Serving PLMN S-NSSAI and a first Mapped (Home) PLMN S-NSSAI, associated with that Serving PLMN S-NSSAI within the Allowed NSSAI, into a registration request message. In step 1803, the UE 1 sends this registration procedure message to the AMF 2. The registration request message may be a Registration Request message for Mobility Registration Update or Periodic Registration Update.

In one example, the UE 1 may manage the NSSAI storage similar to that shown in step 407 of FIG. 4 or step 1004 of FIG. 10. More specifically, the Allowed NSSAI may contain a combination of a Serving PLMN S-NSSAI (e.g., S-NSSAI #3) and a first Mapped (HPLMN)S-NSSAI (e.g., S-NSSAI #1), while the Pending NSSAI may contain a combination of that Serving PLMN S-NSSAI (e.g., S-NSSAI #3) and a second Mapped (HPLMN)S-NSSAI (S-NSSAI #2). In this case, even if the Serving PLMN S-NSSAI (e.g., S-NSSAI #3) is contained in the Pending NSSAI, the UE 1 is allowed to set the Serving PLMN S-NSSAI (e.g., S-NSSAI #3) into a Requested NSSAI (IE) of the registration request message, and set the first Mapped (HPLMN)S-NSSAI (S-NSSAI #1) into a Requested mapped NSSAI (IE) of the same message.

In another example, the UE 1 may manage the NSSAI storage similar to that shown in step 1306 of FIG. 13. More specifically, the Allowed NSSAI may contain a combination of a Serving PLMN S-NSSAI (e.g., S-NSSAI #3) and a first Mapped (HPLMN)S-NSSAI (e.g., S-NSSAI #1), while the Rejected NSSAI may contain that Serving PLMN S-NSSAI (e.g., S-NSSAI #3). In this case, despite the fact that the Serving PLMN S-NSSAI (e.g., S-NSSAI #3) is included in the Rejected NSSAI, the UE 1 may set the Serving PLMN S-NSSAI (e.g., S-NSSAI #3) into a Requested NSSAI (IE) of the registration request message, and set the first Mapped (HPLMN)S-NSSAI (S-NSSAI #1) into a Requested mapped NSSAI (IE) of the same message.

The operation described in this embodiment provides a UE operation for a registration procedure suitable when multiple Mapped (PLMN)S-NSSAIs are mapped to the same Serving PLMN S-NSSAI.

Figure 19:
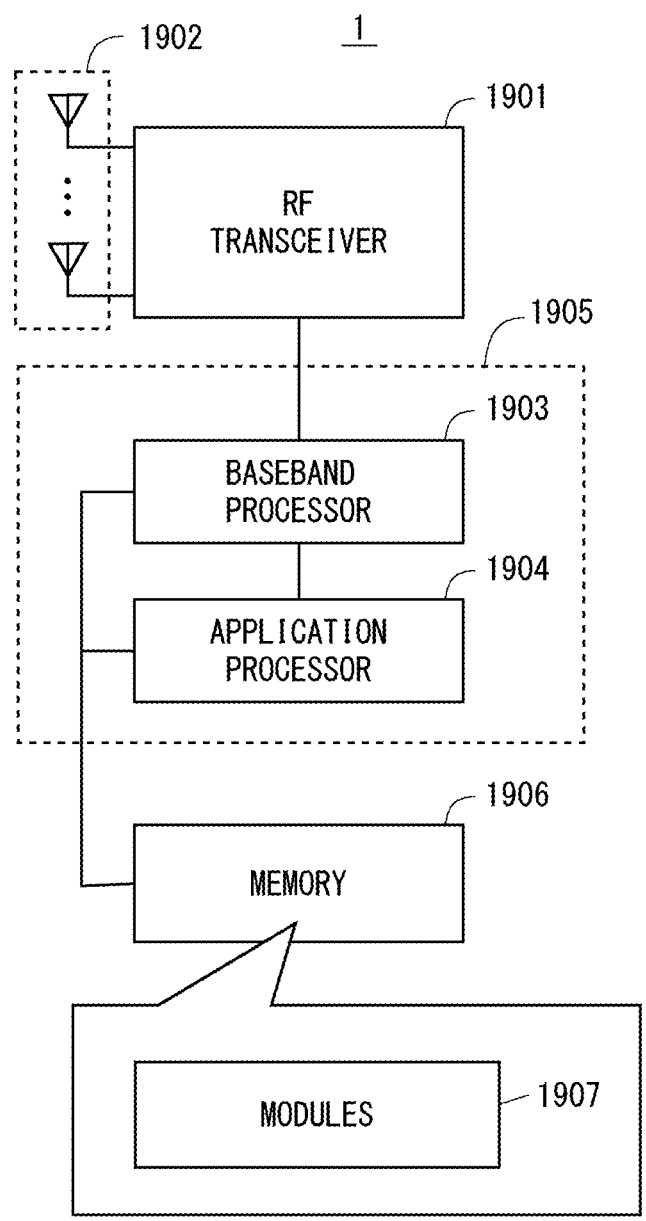
FIG. 19 is a block diagram showing an example configuration of a UE according to an embodiment.

The following provides configuration examples of the UE 1, the AMF 2, and the UDM 8 according to the above-described embodiments. FIG. 14 is a block diagram showing an example configuration of the UE 1. FIG. 19 is a block diagram showing an example configuration of the UE 1. A Radio Frequency (RF) transceiver 1901 performs analog RF signal processing to communicate with RAN nodes. The RF transceiver 1901 may include a plurality of transceivers. The analog RF signal processing performed by the RF transceiver 1901 includes frequency up-conversion, frequency down-conversion, and amplification. The RF transceiver 1901 is coupled to an antenna array 1902 and a baseband processor 1903. The RF transceiver 1901 receives modulated symbol data (or OFDM symbol data) from the baseband processor 1903, generates a transmission RF signal, and supplies the transmission RF signal to the antenna array 1902. Further, the RF transceiver 1901 generates a baseband reception signal based on a reception RF signal received by the antenna array 1902 and supplies the baseband reception signal to the baseband processor 1903. The RF transceiver 1901 may include an analog beamformer circuit for beam forming. The analog beamformer circuit includes, for example, a plurality of phase shifters and a plurality of power amplifiers.

The baseband processor 1903 performs digital baseband signal processing (i.e., data-plane processing) and control-plane processing for radio communication. The digital baseband signal processing includes (a) data compression/decompression, (b) data segmentation/concatenation, (c) composition/decomposition of a transmission format (i.e., transmission frame) (d) channel coding/decoding, (e) modulation (i.e., symbol mapping)/demodulation, and (f) generation of OFDM symbol data (i.e., baseband OFDM signal) by Inverse Fast Fourier Transform (IFFT). Meanwhile, the control-plane processing includes communication management of layer 1 (e.g., transmission power control), layer 2 (e.g., radio resource management and hybrid automatic repeat request (HARQ) processing), and layer 3 (e.g., signaling regarding attach, mobility, and call management).

The digital baseband signal processing by the baseband processor 1903 may include, for example, signal processing of Service Data Adaptation Protocol (SDAP), Packet Data Convergence Protocol (PDCP), Radio Link Control (RLC), Medium Access Control (MAC), and Physical (PHY) layers. The control-plane processing performed by the baseband processor 1903 may include processing of Non-Access Stratum (NAS) protocols, Radio Resource Control (RRC) protocols, and MAC Control Elements (CEs). The baseband processor 1903 may perform Multiple Input Multiple Output (MIMO) encoding and pre-coding for beam forming.

The baseband processor 1903 may include a modem processor (e.g., Digital Signal Processor (DSP)) that performs the digital baseband signal processing and a protocol stack processor (e.g., a Central Processing Unit (CPU) or a Micro Processing Unit (MPU)) that performs the control-plane processing. In this case, the protocol stack processor, which performs the control-plane processing, may be integrated with an application processor 1904 described in the following.

The application processor 1904 is also referred to as a CPU, an MPU, a microprocessor, or a processor core. The application processor 1904 may include a plurality of processors (or processor cores). The application processor 1904 loads a system software program (Operating System (OS)) and various application programs (e.g., a call application, a WEB browser, a mailer, a camera operation application, and a music player application) from a memory 1906 or from another memory (not shown) and executes these programs, thereby providing various functions of the UE 1.

In some implementations, as represented by a dashed line (1905) in FIG. 19, the baseband processor 1903 and the application processor 1904 may be integrated on a single chip. In other words, the baseband processor 1903 and the application processor 1904 may be implemented in a single System on Chip (SoC) device 1905. The SoC device may be referred to as a Large-Scale Integration (LSI) or a chipset.

The memory 1906 is a volatile memory, a non-volatile memory, or a combination thereof. The memory 1906 may include a plurality of memory devices that are physically independent from each other. The volatile memory is, for example, a Static Random Access Memory (SRAM), a Dynamic RAM (DRAM), or a combination thereof. The non-volatile memory is, for example, a Mask Read Only Memory (MROM), an Electrically Erasable Programmable ROM (EEPROM), a flash memory, a hard disc drive, or any combination thereof. The memory 1906 may include, for example, an external memory device that can be accessed from the baseband processor 1903, the application processor 1904, and the SoC 1905. The memory 1906 may include an internal memory device that is integrated in the baseband processor 1903, the application processor 1904, or the SoC 1905. Further, the memory 1906 may include a memory in a Universal Integrated Circuit Card (UICC).

The memory 1906 may store one or more software modules (computer programs) 1907 including instructions and data to perform the processing by the UE 1 described in the above embodiments. In some implementations, the baseband processor 1903 or the application processor 1904 may load these software modules 1907 from the memory 1906 and execute the loaded software modules, thereby performing the processing of the UE 1 described in the above embodiments with reference to the drawings.

The control-plane processing and operations performed by the UE 1 described in the above embodiments can be achieved by elements other than the RF transceiver 1901 and the antenna array 1902, i.e., achieved by the memory 1906, which stores the software modules 1907, and one or both of the baseband processor 1903 and the application processor 1904.

Figure 20:
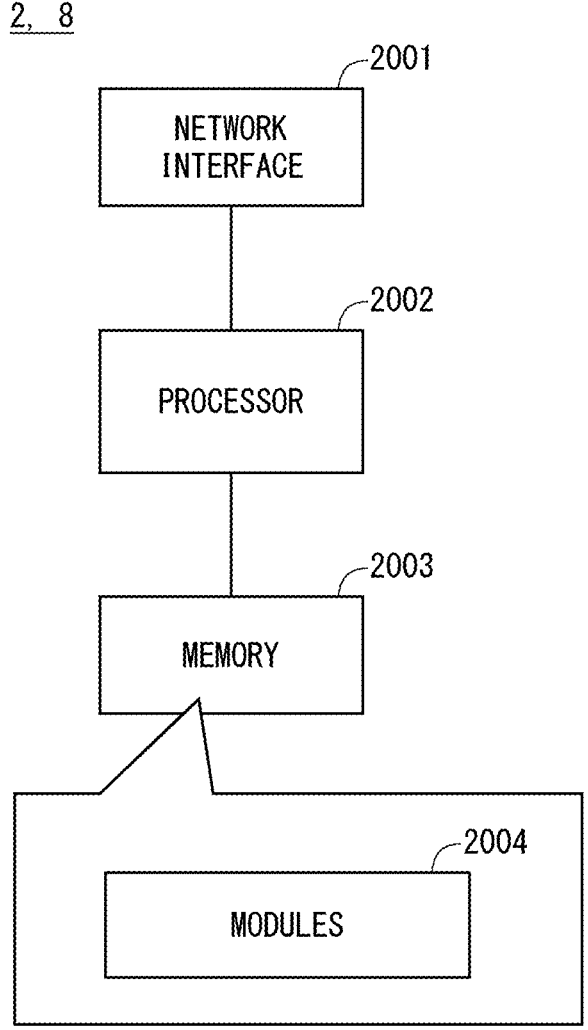
FIG. 20 is a block diagram showing an example configuration of an AMF and a UDM according to an embodiment.

FIG. 20 shows an example configuration of the AMF 2. The UDM 8 may also have the configuration shown in FIG. 20. Referring to FIG. 20, the AMF 2 includes a network interface 2001, a processor 2002, and a memory 2003. The network interface 2001 is used to communicate with, for example, (R)AN nodes and with other network functions (NFs) or nodes in the 5GC. The other NFs or nodes in the 5GC include, for example, UDM, AUSF, SMF, and PCF. The network interface 2001 may include, for example, a network interface card (NIC) conforming to the IEEE 802.3 series.

The processor 2002 may be, for example, a microprocessor, a Micro Processing Unit (MPU), or a Central Processing Unit (CPU). The processor 2002 may include a plurality of processors.

The memory 2003 is composed of a volatile memory and a nonvolatile memory. The volatile memory is, for example, a Static Random Access Memory (SRAM), a Dynamic RAM (DRAM), or a combination thereof. The non-volatile memory is, for example, a Mask Read Only Memory (MROM), an Electrically Erasable Programmable ROM (EEPROM), a flash memory, a hard disc drive, or any combination thereof. The memory 2003 may include a storage located apart from the processor 2002. In this case, the processor 2002 may access the memory 2003 via the network interface 2001 or an I/O interface.

The memory 2003 may store one or more software modules (computer programs) 2004 including instructions and data to perform the processing of the AMF 2 described in the above embodiments. In some implementations, the processor 2002 may be configured to load the one or more software modules 2004 from the memory 2003 and execute the loaded software modules, thereby performing the processing of the AMF 2 described in the above embodiments.

The User Equipment (UE) in the present disclosure is an entity to be connected to a network via a wireless interface. It should be noted that the radio terminal (UE) in the present disclosure is not limited to a dedicated communication device, and it may be any device as follows having the communication functions herein explained.

The terms "User Equipment (UE)" (as the term is used by 3GPP), "mobile station", "mobile terminal", "mobile device", and "radio terminal (wireless device)" are generally intended to be synonymous with one another. The UE may include standalone mobile stations, such as terminals, cell phones, smartphones, tablets, cellular IoT (internet of things) terminals, and IoT devices. It will be appreciated that the terms "UE" and "radio terminal" also encompass devices that remain stationary for a long period of time.

A UE may, for example, be an item of equipment for production or manufacture and/or an item of energy related machinery (for example equipment or machinery such as: boilers; engines; turbines; solar panels; wind turbines; hydroelectric generators; thermal power generators; nuclear electricity generators; batteries; nuclear systems and/or associated equipment; heavy electrical machinery; pumps including vacuum pumps; compressors; fans; blowers; oil hydraulic equipment; pneumatic equipment; metal working machinery; manipulators; robots and/or their application systems; tools; molds or dies; rolls; conveying equipment; elevating equipment; materials handling equipment; textile machinery; sewing machines; printing and/or related machinery; paper making machinery; chemical machinery; mining and/or construction machinery and/or related equipment; agriculture, forestry and/or fisheries machinery and/or implements; safety and/or environment preservation equipment; tractors; bearings; precision bearings; chains; gears; power transmission equipment; lubricators; valves; pipe fittings; and/or application systems for any of the previously mentioned equipment or machinery etc.).

A UE may, for example, be an item of transport equipment (for example transport equipment such as: rolling stocks; motor vehicles; motorcycles; bicycles; trains; buses; carts; rickshaws; ships and other watercraft; aircraft; rockets; satellites; drones; balloons etc.).

A UE may, for example, be an item of information and communication equipment (for example information and communication equipment such as: electronic computer and related equipment; communication and related equipment: electronic components etc.).

A UE may, for example, be an item of refrigeration equipment, a refrigeration application product and equipment, trade and/or service industry equipment, a vending machine, an automatic service machine, an office machine or equipment, a consumer electronic and electronic appliance (for example a consumer electronic appliance such as: audio equipment; a speaker; a radio; video equipment; a television; an oven range; a rice cooker; a coffee maker; a dishwasher; a washing machine; dryers, a fan, an exhaust fan and related products, a vacuum cleaner etc.).

A UE may, for example, be an electrical application system or equipment (for example an electrical application system or equipment such as: an x-ray system; a particle accelerator; radio isotope equipment; sonic equipment; electromagnetic application equipment; electronic power application equipment etc.).

A UE may, for example, be an electronic lamp, a luminaire, a measuring instrument, an analyzer, a tester, or a surveying or sensing instrument (for example a surveying or sensing instrument such as: a smoke alarm; a human alarm sensor; a motion sensor; a wireless tag etc.), a watch or clock, a laboratory instrument, optical apparatus, medical equipment and/or system, a weapon, a sharp-edged tool, a hand tool, or the like.

A UE may, for example, be a wireless-equipped personal digital assistant or related equipment (such as a wireless card or module designed for attachment to or for insertion into another electronic device (for example a personal computer, electrical measuring machine)).

A UE may be a device or a part of a system that provides applications, services, and solutions described below, as to "internet of things (IOT)", using a variety of wired and/or wireless communication technologies. Internet of Things devices (or "things") may be equipped with appropriate electronics, software, sensors, network connectivity, and/or the like, which enable these devices to collect and exchange data with each other and with other communication devices. IoT devices may comprise automated equipment that follow software instructions stored in an internal memory. IoT devices may operate without requiring human supervision or interaction. IoT devices might also remain stationary and/or inactive for a long period of time. IoT devices may be implemented as a part of a (generally) stationary apparatus. IoT devices may also be embedded in non-stationary apparatus (e.g., vehicles) or attached to animals or persons to be monitored/tracked. It will be appreciated that IoT technology can be implemented on any communication devices that can connect to a communications network for sending/receiving data, regardless of whether such communication devices are controlled by human input or software instructions stored in memory. It will be appreciated that IoT devices are sometimes also referred to as Machine-Type Communication (MTC) devices, Machine-to-Machine (M2M) communication devices, or Narrow Band-IoT (NB-IOT) UE.

It will be appreciated that a UE may support one or more IoT or MTC applications.

Some examples of MTC applications are listed in 3GPP TS 22.368 V13.2.0 (Jan. 13, 2017), Annex B (the contents of which are incorporated herein by reference). This list is not exhaustive and is intended to be indicative of some examples of MTC applications. In this list, the Service Area of the MTC applications includes security, tracking & tracing, payment, health, remote maintenance/control, metering, and consumer devices.

Examples of the MTC applications regarding Security include surveillance systems, backup for landline telephone, control of physical access (e.g., to buildings), and car/driver security.

Examples of the MTC applications regarding tacking & tracing include fleet management, order management, telematics insurance: pay as you drive (PAYD), asset tracking, navigation, traffic information, road tolling, and road traffic optimisation/steering.

Examples of the MTC applications regarding payment include point of sales (POS), vending machines, and gaming machines.

Examples of the MTC applications regarding Health include Monitoring vital signs, Supporting the aged or handicapped, Web Access Telemedicine points, and Remote diagnostics.

Examples of the MTC applications regarding remote maintenance/control include sensors, lighting, pumps, valves, elevator control, vending machine control, and vehicle diagnostics.

Examples of the MTC applications regarding metering include power, gas, water, heating, grid control, and industrial metering.

Examples of the MTC applications regarding consumer devices include digital photo frame, digital camera, and ebook.

Applications, services, and solutions may be an mobile virtual network operator (MVNO) service/system, an emergency radio communication service/system, a private branch exchange (PBX) service/system, a PHS/digital cordless telecommunications service/system, a point of sale (POS) service/system, an advertise calling service/system, a Multimedia Broadcast and Multicast Service (MBMS) service/system, a Vehicle to Everything (V2X) service/system, a train radio service/system, a location related service/system, a disaster/emergency wireless communication service/system, an Internet of Things (IOT) service/system, a community service/system, a video streaming service/system, a femto cell application service/system, a Voice over LTE (VOLTE) service/system, a radio tag service/system, a charging service/system, a radio on demand service/system, a roaming service/system, an activity monitoring service/system, a telecom carrier/communication NW selection service/system, a functional restriction service/system, a proof of concept (PoC) service/system, a personal information management service/system, a display video service/system, a non-communication service/system, an ad-hoc network/delay tolerant networking (DTN) service/system, etc.

The above-described UE categories are merely examples of applications of the technical ideas and embodiments described in the present disclosure. The UE described in this disclosure is not limited to these examples and various modifications can be made thereto by those skilled in the art.

The above-described aspects are merely examples of applications of the technical ideas obtained by the inventors. These technical ideas are not limited to the above-described embodiments and various modifications can be made thereto.

The whole or part of the embodiments disclosed above can be described as, but not limited to, the following supplementary notes.

(Supplementary Note 1)

A User Equipment (UE) comprising:
  at least one memory: and
  at least one processor coupled to the at least one memory and configured to:
    manage a Network Slice Selection Assistance Information (NSSAI) storage, including Allowed NSSAI, Pending NSSAI, and Rejected NSSAI; and
    if a Serving Public Land Mobile Network (PLMN) Single NSSAI (S-NSSAI) included in at least one of the Pending NSSAI or the Rejected NSSAI is also included in the Allowed NSSAI, send a registration request message, including the Serving PLMN S-NSSAI and a first mapped Home PLMN S-NSSAI that is associated with the Serving PLMN S-NSSAI in the Allowed NSSAI, to a core network node.

(Supplementary Note 2)

The UE according to Supplementary Note 1, wherein the at least one processor is configured to store a first combination of the Serving PLMN S-NSSAI and the first mapped Home PLMN S-NSSAI into the Allowed NSSAI, while storing a second combination of the Serving PLMN S-NSSAI and a second mapped Home PLMN S-NSSAI into the Pending NSSAI.

(Supplementary Note 3)

The UE according to Supplementary Note 2, wherein the at least one processor is configured to:
  receive from the core network node a first message including an Allowed S-NSSAI information element indicating an association between the Serving PLMN S-NSSAI and the first mapped Home PLMN S-NSSAI and a Pending S-NSSAI information element indicating an association between the Serving PLMN S-NSSAI and the second mapped Home PLMN S-NSSAI; and in response to the first message, store the combination of the Serving PLMN S-NSSAI and the first mapped Home PLMN S-NSSAI into the Allowed NSSAI while storing the combination of the Serving PLMN S-NSSAI and the second mapped Home PLMN S-NSSAI into the Pending NSSAI.

(Supplementary Note 4)

The UE according to any one of Supplementary Notes 1 to 3, wherein the at least one processor is configured to store a combination of the Serving PLMN S-NSSAI and the first mapped Home PLMN S-NSSAI into the Allowed NSSAI, while storing the Serving PLMN S-NSSAI into the Rejected NSSAI.

(Supplementary Note 5)

The UE according to any one of Supplementary Notes 1 to 4, wherein the at least one processor is configured to receive from the core network a second message containing an Extended Rejected NSSAI information element indicating an association between the Serving PLMN S-NSSAI and a third mapped Home PLMN S-NSSAI.

(Supplementary Note 6)

The UE according to Supplementary Note 5, wherein the at least one processor is configured to:

in response to the second message, store the Serving PLMN S-NSSAI into the Rejected NSSAI; and If the Allowed S-NSSAI or the Pending NSSAI includes a third combination of the Serving PLMN S-NSSAI and the third mapped Home PLMN S-NSSAI, remove the third combination from the Allowed S-NSSAI or the Pending NSSAI.

(Supplementary Note 7)

A core network node comprising:

at least one memory: and at least one processor coupled to the at least one memory and configured to:

receive a first message indicating two or more Home Public Land Mobile Network (PLMN) Single Network Slice Selection Assistance Information (S-NSSAIs) from a User Equipment (UE) supporting Network Slice-Specific Authentication and Authorization (NSSAA): and if the two or more Home PLMN S-NSSAIs are associated with a single Serving PLMN S-NSSAI and part of the two or more Home PLMN S-NSSAIs is subject to NSSAA, send a second message to the UE, the second message comprising:

an Allowed NSSAI information element containing a combination of the Serving PLMN S-NSSAI and at least one first Home PLMN S-NSSAI that is not subject to the NSSAA: and a Pending NSSAI information element containing a combination of the Serving PLMN S-NSSAI and at least one second Home PLMN S-NSSAI that is subject to the NSSAA.

(Supplementary Note 8)

The core network node according to Supplementary Note 7, wherein the at least one processor is configured to:

perform an NSSAA procedure for each of the at least one second Home PLMN S-NSSAI: and send to the UE a third message containing a Rejected NSSAI information element indicating that the Serving PLMN S-NSSAI is rejected with respect to an association with a Home PLMN S-NSSAI for which the NSSAA procedure has failed.

(Supplementary Note 9)

The core network node according to Supplementary Note 8, wherein the Rejected NSSAI information element is an extended Rejected NSSAI information element that includes a combination of the Serving PLMN S-NSSAI and the Home PLMN S-NSSAI for which the NSSAA procedure has failed.

(Supplementary Note 10)

The core network node according to Supplementary Note 8 or 9, wherein the at least one processor is configured to send an Allowed NSSAI information element, containing a combination of the Serving PLMN S-NSSAI and a Home PLMN S-NSSAI for which the NSSAA procedure has succeeded, to the UE via the third message or a fourth message that differs from the third message.

(Supplementary Note 11)

A method performed by a User Equipment (UE), the method comprising:

managing a Network Slice Selection Assistance Information (NSSAI) storage, including Allowed NSSAI, Pending NSSAI, and Rejected NSSAI: and if a Serving Public Land Mobile Network (PLMN) Single NSSAI (S-NSSAI) included in at least one of the Pending NSSAI or the Rejected NSSAI is also included in the Allowed NSSAI, sending a registration request message, including the Serving PLMN S-NSSAI and a first mapped Home PLMN S-NSSAI that is associated with the Serving PLMN S-NSSAI in the Allowed NSSAI, to a core network node.

(Supplementary Note 12)

A method performed by a core network node, the method comprising:

receiving a first message indicating two or more Home Public Land Mobile Network (PLMN) Single Network Slice Selection Assistance Information (S-NSSAIs) from a User Equipment (UE) supporting Network Slice-Specific Authentication and Authorization (NSSAA): and if the two or more Home PLMN S-NSSAIs are associated with a single Serving PLMN S-NSSAI and part of the two or more Home PLMN S-NSSAIs is subject to NSSAA, sending a second message to the UE, the second message comprising:

an Allowed NSSAI information element containing a combination of the Serving PLMN S-NSSAI and at least one first Home PLMN S-NSSAI that is not subject to the NSSAA: and a Pending NSSAI information element containing a combination of the Serving PLMN S-NSSAI and at least one second Home PLMN S-NSSAI that is subject to the NSSAA.

(Supplementary Note A1)

A method for a communication terminal configured to store at least one of Rejected Network Slice Selection Assistance Information (NSSAI) or Pending NSAAI, the method comprising:

receiving a first Single NSSAI (S-NSSAI) included in a configuration update command message:

storing the first S-NSSAI into the Rejected NSSAI; and receiving a second S-NSSAI included in an Extended rejected NSSAI information element.

(Supplementary Note A2)

The method according to Supplementary Note A1, comprising removing the second S-NSSAI from the Pending NSSAI stored, upon receipt of the second S-NSSAI included in the Extended rejected NSSAI information element.
(Supplementary Note A3)
The method according to Supplementary Note A1, comprising removing the second S-NSSAI from the Pending NSSAI in a case where the second S-NSSAI is included in a Mapped S-NSSAI for a Rejected S-NSSAI.
(Supplementary Note A4)
The method according to any one of Supplementary Notes A1 to A3, wherein the Extended rejected NSSAI information element includes a mapped Home PLMN (HPLMN)S-NSSAI.
(Supplementary Note A5)
The method according to any one of Supplementary Notes A1 to A4, wherein the Rejected NSSAI is an S-NSSAI sent by Access and Mobility Management Function (AMF).
(Supplementary Note A6)
The method according to any one of Supplementary Notes A1 to A5, wherein the Pending NSSAI is NSSAI indicating an S-NSSAI for which a network slice-related authentication and authorization procedure is pending.
(Supplementary Note A7)
A communication terminal configured to store at least one of Rejected Network Slice Selection Assistance Information (NSSAI) or Pending NSSAI, comprising:
  means for receiving a first Single NSSAI (S-NSSAI) included in a configuration update command message;
  means for storing the first S-NSSAI into the Rejected NSSAI; and
  means for receiving a second S-NSSAI included in an Extended rejected NSSAI information element.
(Supplementary Note A8)
The communication terminal according to Supplementary Note A7, comprising means for removing the second S-NSSAI from the Pending NSSAI stored, upon receipt of the second S-NSSAI included in the Extended rejected NSSAI information element.
(Supplementary Note A9)
The communication terminal according to Supplementary Note A7, comprising means for removing the second S-NSSAI from the Pending NSSAI in a case where the second S-NSSAI is included in a Mapped S-NSSAI for a Rejected S-NSSAI.
(Supplementary Note A10)
The communication terminal according to any one of Supplementary Notes A7 to A9, wherein the Extended rejected NSSAI information element includes a mapped Home PLMN (HPLMN)S-NSSAI.
(Supplementary Note A11)
The communication terminal according to any one of Supplementary Notes A7 to A10, wherein the Rejected NSSAI is an S-NSSAI sent by Access and Mobility Management Function (AMF).
(Supplementary Note A12)
The communication terminal according to any one of Supplementary Notes A7 to A11, wherein the Pending NSSAI is NSSAI indicating an S-NSSAI for which a network slice-related authentication and authorization procedure is pending.

This application is based upon and claims the benefit of priority from Japanese Patent Application No. 2020-167942, filed on Oct. 2, 2020, the disclosure of which is incorporated herein in its entirety by reference.

REFERENCE SIGNS LIST

1 UE
2 AMF
3 SMF
4 AUSF
5 AN
6 UPF
7 DN
8 UDM
1903 Baseband Processor
1904 Application Processor
1906 Memory
1907 Modules
2002 Processor
2003 Memory
2004 Modules

What is claimed is:
1. A method for a communication terminal configured to store Rejected Network Slice Selection Assistance Information (NSSAI) and Pending NSSAI, the method comprising:
  receiving at least one of a rejected NSSAI information element, and an Extended rejected NSSAI information element, via a configuration update command message;
  in response to receiving the rejected NSSAI information element, storing Single NSSAI (S-NSSAI), which is included in the rejected NSSAI information element, into the Rejected NSSAI; and
  in response to receiving the Extended rejected NSSAI information element, removing S-NSSAI including mapped S-NSSAI, which is included in the Extended rejected NSSAI information element, from the Pending NSSAI and refraining from storing the S-NSSAI including mapped S-NSSAI in the Rejected NSSAI.

2. A communication terminal configured to be capable of storing Rejected Network Slice Selection Assistance Information (NSSAI) and Pending NSSAI, the communication terminal comprising:
  at least one memory; and
  at least one processor coupled to the memory and configured to:
    receive at least one of a rejected NSSAI information element, and an Extended rejected NSSAI information element, via a configuration update command message;
  in response to receiving the rejected NSSAI information element, store Single NSSAI (S-NSSAI), which is included in the rejected NSSAI information element, into the Rejected NSSAI; and
  in response to receiving the Extended rejected NSSAI information element, remove S-NSSAI including mapped S-NSSAI, which is included in the Extended rejected NSSAI information element, from the Pending NSSAI and refrain from storing the S-NSSAI including mapped S-NSSAI in the Rejected NSSAI.

* * * * *